United States Patent
Pinske et al.

(10) Patent No.: US 12,471,642 B2
(45) Date of Patent: Nov. 18, 2025

(54) HEATED GARMENT COMMUNICATION

(71) Applicant: MILWAUKEE ELECTRIC TOOL CORPORATION, Brookfield, WI (US)

(72) Inventors: Jonathan Pinske, Pewaukee, WI (US); Ryan Spiering, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 690 days.

(21) Appl. No.: 17/872,881

(22) Filed: Jul. 25, 2022

(65) Prior Publication Data

US 2023/0028582 A1    Jan. 26, 2023

Related U.S. Application Data

(60) Provisional application No. 63/275,082, filed on Nov. 3, 2021, provisional application No. 63/224,974, filed on Jul. 23, 2021.

(51) Int. Cl.
*H01R 33/00* (2006.01)
*A41D 1/00* (2018.01)
(Continued)

(52) U.S. Cl.
CPC .......... *A41D 1/005* (2013.01); *A41D 13/0051* (2013.01); *H01M 10/0436* (2013.01);
(Continued)

(58) Field of Classification Search
CPC ...... A41D 1/005; A41D 13/0051; H04W 4/80
See application file for complete search history.

(56) References Cited

U.S. PATENT DOCUMENTS

| | | |
|---|---|---|
| 4,950,868 A | 8/1990 | Moss et al. |
| 5,105,067 A | 4/1992 | Brekkestran et al. |

(Continued)

FOREIGN PATENT DOCUMENTS

| | | |
|---|---|---|
| CN | 201624162 U | 11/2010 |
| CN | 203152547 U | 8/2013 |

(Continued)

OTHER PUBLICATIONS

International Search Report and Written Opinion for Application No. PCT/US2022/038213 dated Nov. 11, 2022 (11 pages).

*Primary Examiner* — Neil Abrams
(74) *Attorney, Agent, or Firm* — Michael Best & Friedrich LLP

(57) ABSTRACT

A power source for a heated garment. The power source includes a housing, one or more battery cells located within the housing, a user interface positioned on the housing, an electrical interface positioned on the housing for connecting to the heated garment, and a controller located within the housing and including an electronic processor and a memory, the controller coupled to the battery cells, the user interface, and the electrical interface. The controller is configured to communicate with the heated garment and a device. Communicating with a device includes at least one of transmitting the status of the battery cells, receiving heated garment preset temperature information, and receiving desired temperature information. Communicating with the heated garment includes at least one of enabling heated garment components, receiving temperature information, receiving garment type information, and controlling heated zones within the heated garment.

14 Claims, 32 Drawing Sheets

(51) Int. Cl.
*A41D 13/005* (2006.01)
*H01M 10/04* (2006.01)
*H01M 10/42* (2006.01)
*H04W 4/80* (2018.01)
*H05B 1/02* (2006.01)
*H05B 3/34* (2006.01)

(52) U.S. Cl.
CPC ........... *H01M 10/425* (2013.01); *H04W 4/80* (2018.02); *H05B 1/0272* (2013.01); *H05B 3/342* (2013.01); *A41D 2400/12* (2013.01); *H01M 2220/30* (2013.01); *H05B 2203/036* (2013.01)

(56) References Cited

U.S. PATENT DOCUMENTS

| | | | |
|---|---|---|---|
| 5,148,002 A | 9/1992 | Kuo et al. | |
| 6,098,612 A | 8/2000 | Nakamoto et al. | |
| 6,125,636 A | 10/2000 | Taylor et al. | |
| 6,138,664 A | 10/2000 | Hanada et al. | |
| 6,206,909 B1 | 3/2001 | Hanada et al. | |
| 6,239,410 B1 | 5/2001 | Tackore | |
| 6,332,221 B1 | 12/2001 | Gracey | |
| 6,550,471 B2 | 4/2003 | Szymocha et al. | |
| 6,649,873 B1 | 11/2003 | Cintron, Jr. et al. | |
| 6,770,848 B2 | 8/2004 | Haas et al. | |
| 6,910,931 B1 | 6/2005 | Nakase | |
| 6,915,641 B2 | 7/2005 | Harvie | |
| 6,957,697 B2 | 10/2005 | Chambers | |
| 7,000,682 B2 | 2/2006 | Chambers | |
| 7,022,950 B2 | 4/2006 | Haas et al. | |
| 7,152,412 B2 | 12/2006 | Harvie | |
| 7,373,969 B2 | 5/2008 | Chambers | |
| 7,448,874 B2 * | 11/2008 | Willis .................. | G01K 1/02 374/E13.002 |
| 7,637,263 B2 | 12/2009 | Fisher et al. | |
| 7,816,628 B2 | 10/2010 | Fernandez et al. | |
| 7,816,632 B2 | 10/2010 | Bourke, III et al. | |
| 7,861,326 B2 | 1/2011 | Harty | |
| 8,062,797 B2 | 11/2011 | Fisher et al. | |
| 8,084,722 B2 | 12/2011 | Haas et al. | |
| 8,212,185 B1 | 7/2012 | Barron | |
| 8,468,613 B2 | 6/2013 | Harty | |
| 8,779,331 B2 | 7/2014 | Rothschild | |
| 8,943,617 B2 | 2/2015 | Harty | |
| 9,175,887 B2 | 11/2015 | Lau | |
| 9,339,066 B2 | 5/2016 | Codner et al. | |
| 9,381,385 B2 | 7/2016 | Fuhr et al. | |
| 9,516,907 B2 | 12/2016 | Guidry | |
| 9,610,476 B1 | 4/2017 | Tran et al. | |
| 9,713,756 B1 | 7/2017 | Tran et al. | |
| 9,717,949 B1 | 8/2017 | Tran et al. | |
| 9,717,958 B1 | 8/2017 | Tran et al. | |
| 9,776,064 B2 | 10/2017 | Harty | |
| 9,794,987 B2 | 10/2017 | Hung et al. | |
| 9,849,364 B2 | 12/2017 | Tran et al. | |
| 9,877,526 B2 | 1/2018 | Haas et al. | |
| 9,894,944 B2 | 2/2018 | Brooks et al. | |
| 9,963,210 B1 | 5/2018 | Ebot | |
| 9,975,033 B2 | 5/2018 | Tran et al. | |
| 10,022,613 B2 | 7/2018 | Tran et al. | |
| 10,022,614 B1 | 7/2018 | Tran et al. | |
| 10,034,066 B2 | 7/2018 | Tran et al. | |
| 10,045,573 B2 | 8/2018 | Maxey et al. | |
| 10,046,228 B2 | 8/2018 | Tran et al. | |
| 10,046,229 B2 | 8/2018 | Tran et al. | |
| 10,051,898 B2 | 8/2018 | Maxey et al. | |
| 10,052,519 B2 | 8/2018 | Tran et al. | |
| 10,195,513 B2 | 2/2019 | Tran et al. | |
| 10,200,834 B2 | 2/2019 | Tran et al. | |
| 10,201,195 B1 | 2/2019 | Khaliuta et al. | |
| 10,212,763 B2 | 2/2019 | Kurley et al. | |
| 10,232,165 B2 | 3/2019 | Hyde et al. | |
| 10,252,145 B2 | 4/2019 | Tran et al. | |
| 10,257,884 B2 | 4/2019 | Kuwabara | |
| 10,278,433 B2 | 5/2019 | Esenwein et al. | |
| 10,368,592 B2 | 8/2019 | Roh | |
| 10,420,175 B2 | 9/2019 | Saunamäki | |
| 10,499,216 B2 | 12/2019 | Tran et al. | |
| 10,499,503 B2 | 12/2019 | Seo | |
| 10,532,268 B2 | 1/2020 | Tran et al. | |
| 10,596,365 B2 | 3/2020 | Hyde et al. | |
| 10,716,341 B2 | 7/2020 | Maxey et al. | |
| 10,721,977 B2 | 7/2020 | Gueritee et al. | |
| 10,789,590 B2 | 9/2020 | Tran et al. | |
| 10,873,837 B2 | 12/2020 | Tran et al. | |
| 10,893,576 B2 | 1/2021 | Strecker | |
| 11,950,642 B2 * | 4/2024 | Malhotra ................ | H02J 50/10 |
| 2002/0045363 A1 * | 4/2002 | Tilbury ................ | A41D 27/205 439/37 |
| 2005/0007406 A1 | 1/2005 | Haas et al. | |
| 2006/0001727 A1 | 1/2006 | Haas et al. | |
| 2006/0235498 A1 | 10/2006 | Mollendorf et al. | |
| 2008/0093354 A1 | 4/2008 | Fang et al. | |
| 2009/0230112 A1 | 9/2009 | Ducharme et al. | |
| 2009/0306748 A1 | 12/2009 | Mollendorf et al. | |
| 2010/0057168 A1 | 3/2010 | Slade et al. | |
| 2010/0084125 A1 | 4/2010 | Goldstein et al. | |
| 2013/0001212 A1 | 1/2013 | Mangoubi et al. | |
| 2013/0306614 A1 | 11/2013 | Fey, Jr. | |
| 2014/0246416 A1 | 9/2014 | White | |
| 2014/0353300 A1 | 12/2014 | Swiatek et al. | |
| 2015/0060430 A1 | 3/2015 | Tsuge et al. | |
| 2015/0083705 A1 | 3/2015 | Cronn et al. | |
| 2015/0136753 A1 | 5/2015 | Cronn et al. | |
| 2015/0230524 A1 | 8/2015 | Stevens et al. | |
| 2015/0380843 A1 * | 12/2015 | Dubal ................... | H01R 13/20 439/889 |
| 2015/0382402 A1 | 12/2015 | Chen et al. | |
| 2016/0095369 A1 | 4/2016 | Roberts et al. | |
| 2016/0262924 A1 | 9/2016 | Abreu | |
| 2017/0157435 A1 | 6/2017 | Choi | |
| 2017/0196275 A1 | 7/2017 | Tam et al. | |
| 2017/0209301 A1 | 7/2017 | Deseve | |
| 2017/0241797 A1 | 8/2017 | Kong et al. | |
| 2017/0258628 A1 | 9/2017 | Awasthi | |
| 2017/0258629 A1 | 9/2017 | Awasthi | |
| 2017/0265533 A1 | 9/2017 | Gueritee et al. | |
| 2017/0332442 A1 | 11/2017 | Strecker | |
| 2017/0354190 A1 | 12/2017 | Cauchy | |
| 2018/0064202 A1 | 3/2018 | Kong et al. | |
| 2018/0078843 A1 | 3/2018 | Tran et al. | |
| 2018/0193185 A1 | 7/2018 | Thomas et al. | |
| 2018/0255847 A1 | 9/2018 | Gueritee et al. | |
| 2018/0280190 A1 | 10/2018 | Betkowski et al. | |
| 2018/0317572 A1 | 11/2018 | Guttman et al. | |
| 2018/0317597 A1 | 11/2018 | Maxey et al. | |
| 2018/0344515 A1 | 12/2018 | Ebben et al. | |
| 2018/0361167 A1 | 12/2018 | De La Torre Barreiro | |
| 2018/0361704 A1 | 12/2018 | Jin et al. | |
| 2019/0029877 A1 | 1/2019 | Betkowski | |
| 2019/0104776 A1 | 4/2019 | Luoma et al. | |
| 2019/0166928 A1 | 6/2019 | Miwa et al. | |
| 2019/0175810 A1 | 6/2019 | Quiroz et al. | |
| 2019/0191284 A1 | 6/2019 | Tran et al. | |
| 2019/0200184 A1 | 6/2019 | Tran et al. | |
| 2019/0247224 A1 | 8/2019 | Castellani et al. | |
| 2019/0297960 A1 | 10/2019 | Jur et al. | |
| 2019/0367172 A1 | 12/2019 | Carver et al. | |
| 2019/0374376 A1 | 12/2019 | Khaliuta et al. | |
| 2019/0379010 A1 | 12/2019 | Khaliuta et al. | |
| 2019/0379223 A1 | 12/2019 | Khaliuta et al. | |
| 2020/0025424 A1 | 1/2020 | Cauchy | |
| 2020/0101367 A1 | 4/2020 | Tran et al. | |
| 2020/0170314 A1 | 6/2020 | Gueritee et al. | |
| 2020/0216132 A1 | 7/2020 | Fuchs et al. | |
| 2020/0268064 A1 | 8/2020 | Zhang | |
| 2020/0316365 A1 | 10/2020 | Hyde et al. | |
| 2020/0329787 A1 | 10/2020 | Maxey et al. | |
| 2020/0383394 A1 | 12/2020 | Bean et al. | |
| 2020/0383395 A1 | 12/2020 | Bean et al. | |
| 2020/0383396 A1 | 12/2020 | Bean et al. | |
| 2020/0383397 A1 | 12/2020 | Bean et al. | |

(56) References Cited

U.S. PATENT DOCUMENTS

| | | |
|---|---|---|
| 2020/0387896 A1 | 12/2020 | Tran et al. |
| 2020/0404987 A1 | 12/2020 | Betkowski |
| 2021/0041147 A9 | 2/2021 | Cauchy |
| 2021/0077304 A1 | 3/2021 | Xu et al. |
| 2021/0084459 A1 | 3/2021 | Tran et al. |
| 2022/0154389 A1 | 5/2022 | Alexander et al. |
| 2022/0225696 A1 | 7/2022 | Farrell et al. |

FOREIGN PATENT DOCUMENTS

| | | |
|---|---|---|
| CN | 203633540 U | 6/2014 |
| CN | 203676220 U | 7/2014 |
| CN | 203897362 U | 10/2014 |
| CN | 104643306 A | 5/2015 |
| CN | 204561051 U | 8/2015 |
| CN | 105533841 A | 5/2016 |
| CN | 205456214 U | 8/2016 |
| CN | 105943000 A | 9/2016 |
| CN | 105979616 A | 9/2016 |
| CN | 106016746 A | 10/2016 |
| CN | 106137517 A | 11/2016 |
| CN | 106213612 A | 12/2016 |
| CN | 106723470 A | 5/2017 |
| CN | 107259669 A | 10/2017 |
| CN | 206776812 U | 12/2017 |
| CN | 207411527 U | 5/2018 |
| CN | 108095212 A | 6/2018 |
| CN | 106666861 B | 11/2018 |
| CN | 108936867 A | 12/2018 |
| CN | 208581355 U | 3/2019 |
| CN | 109602104 A | 4/2019 |
| CN | 208740143 U | 4/2019 |
| CN | 208941088 U | 6/2019 |
| CN | 110051058 A | 7/2019 |
| CN | 110584256 A | 12/2019 |
| CN | 110613186 A | 12/2019 |
| CN | 209732645 U | 12/2019 |
| CN | 110801060 A | 2/2020 |
| CN | 111053305 A | 4/2020 |
| CN | 210227009 U | 4/2020 |
| CN | 210515056 U | 5/2020 |
| CN | 110209222 B | 9/2021 |
| DE | 202014007154 U1 | 9/2014 |
| DE | 102014205722 A1 | 10/2015 |
| DE | 102015226237 A1 | 6/2017 |
| DE | 102011007419 B4 | 9/2019 |
| EP | 2181614 B1 | 12/2014 |
| EP | 2182772 B1 | 6/2015 |
| EP | 3389337 B1 | 10/2020 |
| FR | 3008283 A1 | 1/2015 |
| KR | 101747247 B1 | 6/2017 |
| WO | WO9801009 A1 | 1/1998 |
| WO | WO2006080680 A1 | 8/2006 |
| WO | WO2008006731 A1 | 1/2008 |
| WO | WO2008036283 A2 | 3/2008 |
| WO | WO2014013347 A2 | 1/2014 |
| WO | WO2016082259 A1 | 6/2016 |
| WO | WO2017013552 A1 | 1/2017 |
| WO | WO2017017698 A2 | 2/2017 |
| WO | WO2017048198 A1 | 3/2017 |
| WO | WO2017095025 A1 | 6/2017 |
| WO | WO2019016524 A1 | 1/2019 |
| WO | WO2019229773 A1 | 12/2019 |
| WO | WO2019238776 A1 | 12/2019 |
| WO | WO2020079540 A1 | 4/2020 |
| WO | WO2020121011 A1 | 6/2020 |
| WO | WO2020212724 A1 | 10/2020 |

* cited by examiner

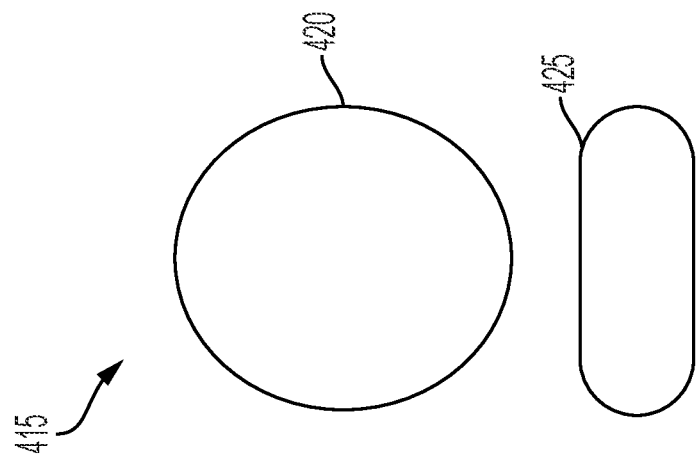
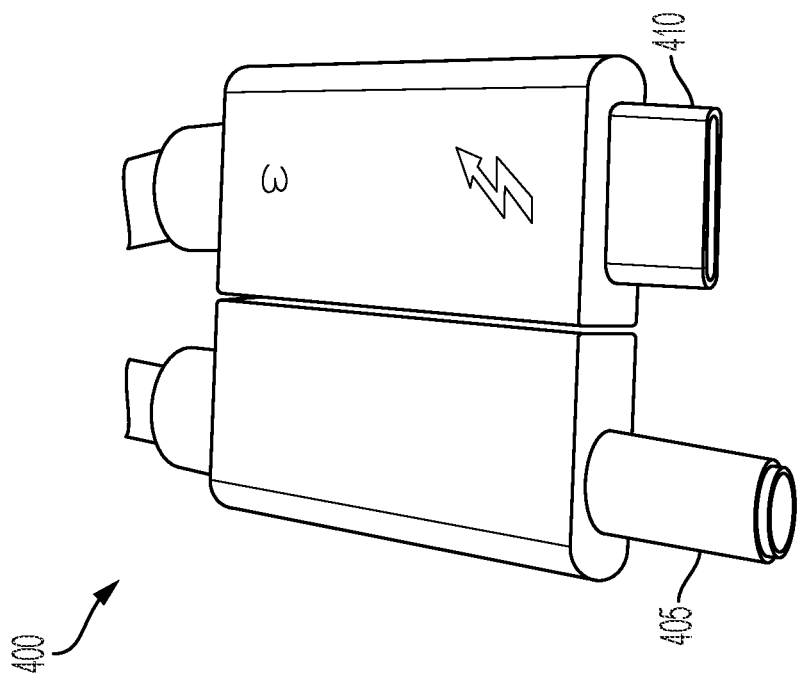

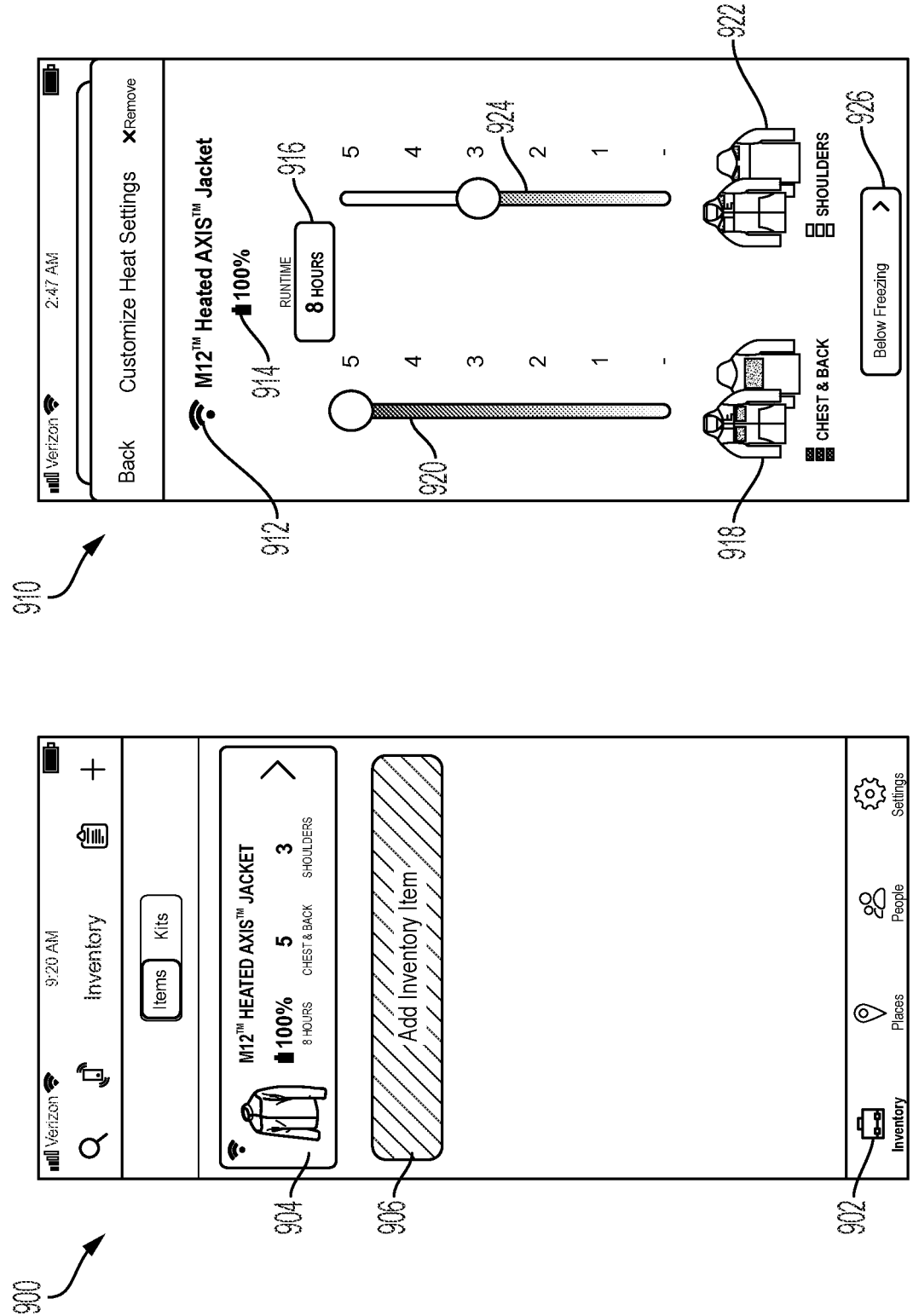

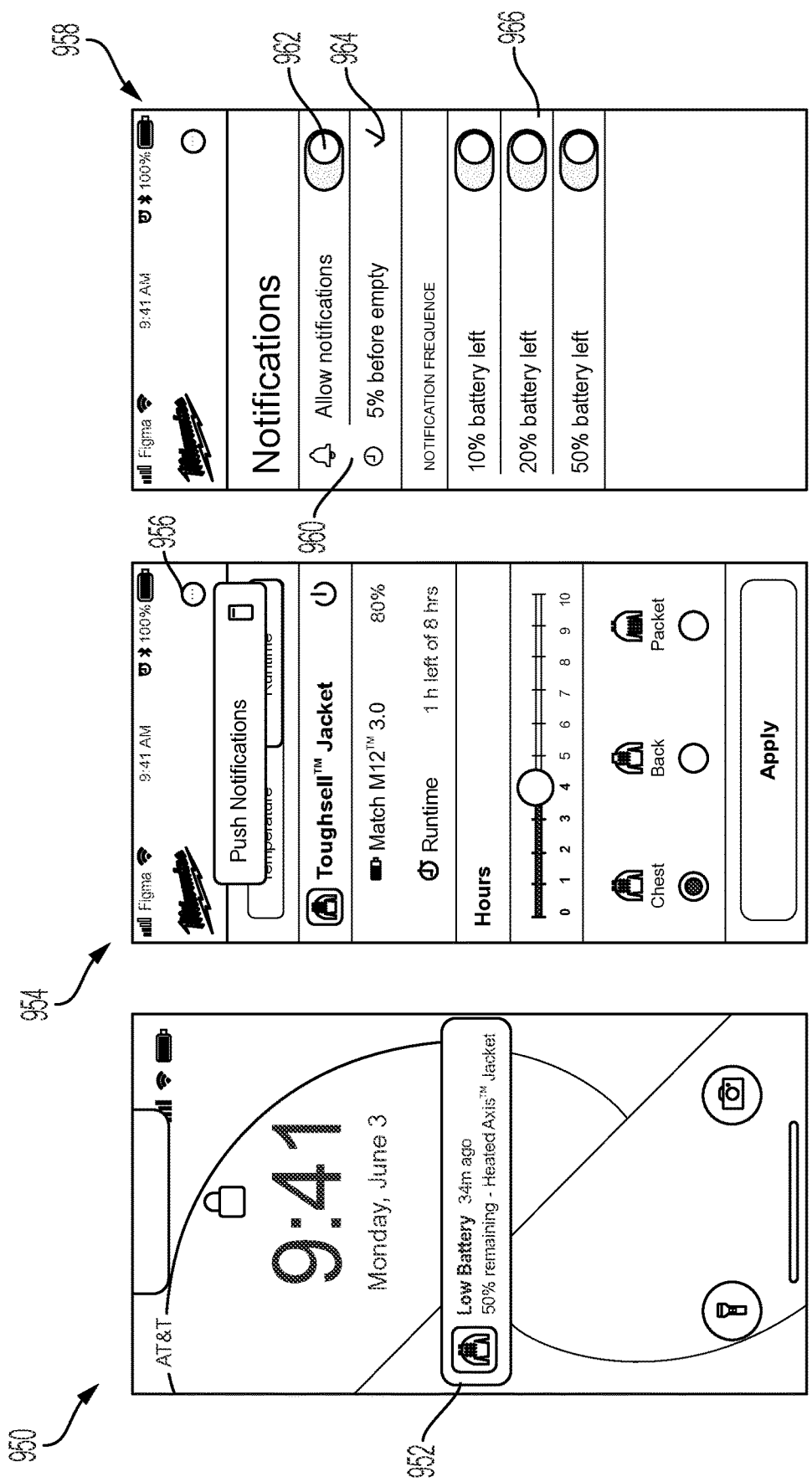

HEATED GARMENT COMMUNICATION

RELATED APPLICATIONS

This application claims the benefit of U.S. Provisional Patent Application No. 63/224,974, filed Jul. 23, 2021 and U.S. Provisional Patent Application No. 63/275,082, filed Nov. 3, 2021, the entire content of which is hereby incorporated by reference.

FIELD

The present application relates to heated garments and, in particular, a power source for heated garments.

SUMMARY

Heated garments require input power to power heating elements. Compact battery packs provide the required input power to the heated garments. Traditionally, a heating level of a heated garment with multiple heating levels is controlled at the heated garment itself. For example, if the heated garment is a heated jacket, the heated jacket may include a button that a user can actuate to choose between discrete heating levels. Typically, if a user is wearing multiple heated garments, then the user has to power each heated garment with an individual battery pack. Additionally, the user may desire to adjust the heating level of each individual garment to achieve desired heating levels.

The present disclosure provides, among other things, external control of heated garments. For example, it may be advantageous to control heated garments via communication between the battery pack and an external device. Heated garment communication could be achieved with wireless communication between the battery pack and the external device. It may also be advantageous for the battery pack to communicate with the heated garments to determine the status of the heated garments. For example, bi-directional communication between the heated garment and the battery pack would allow for increased user control of the heated garment. Additionally, multiple heated garments would benefit from being able to be powered and controlled by the single battery pack, at the external device.

Embodiments described herein provide power source for a heated garment. The power source includes a housing, one or more battery cells located within the housing, a user interface positioned on the housing, an electrical interface positioned on the housing for connecting to the heated garment, and a controller located within the housing and including an electronic processor and a memory, the controller coupled to the battery cells, the user interface, and the electrical interface. The controller is configured to communicate with the heated garment and a device. Communicating with a device includes at least one of transmitting the status of the battery cells, receiving heated garment preset temperature information, and receiving desired temperature information. Communicating with the heated garment includes at least one of enabling heated garment components, receiving temperature information, receiving garment type information, and controlling heated zones within the heated garment.

Further embodiments described herein provide a method of providing a power to a heated garment from a battery pack. The method comprises pairing, via a pack transceiver of the battery pack, the battery pack to an external device, receiving, via the pack transceiver, a first input from the external device, determining, via a pack electronic processor of the battery pack coupled to the pack transceiver, an amount of current to provide to a first heating zone of the heated garment based on the first input, and providing, via a wired connection between the battery pack and the heated garment, the amount of current to the first heating zone of the heated garment.

Further embodiments described herein provide a system for providing power to a heated garment. The system comprises an external device, a heated garment including a heater, and a battery pack. The battery pack includes one or more battery cells, an electrical interface for at least one of receiving charge and connecting to the heated garment, and a controller including an electronic processor, a memory, and a transceiver. The controller is coupled to the battery cells and the electrical interface. The controller is configured to determine, based on a signal from the electrical interface, that the heated garment has been connected to the battery pack via a wired connection, receive, via the transceiver, an input from the external device, determine, based on the input, an amount of current to provide to the heater of the heated garment, and provide the amount of current to the heater of the heated garment via the wired connection.

BRIEF DESCRIPTION OF THE DRAWINGS

FIG. 8A illustrates a first dual connector from the heated garment of FIG. 2, according to some embodiments.

FIG. 8B illustrates a first dual connector port for the battery packs of FIGS. 1A & 1B, according to some embodiments.

FIGS. 14A-14M illustrate user interfaces for an external device, according to some embodiments.

DETAILED DESCRIPTION

Figure 1A:
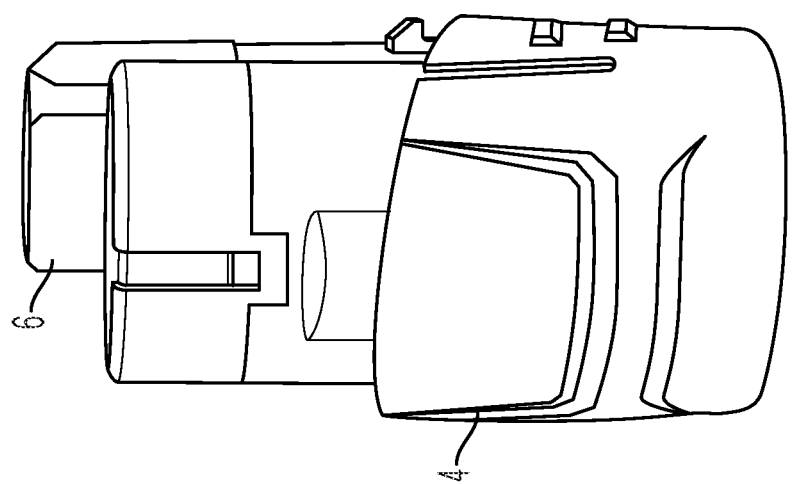
FIG. 1A illustrates a battery pack for communicating with and powering a heated garment, according to some embodiments.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Figure 13A:
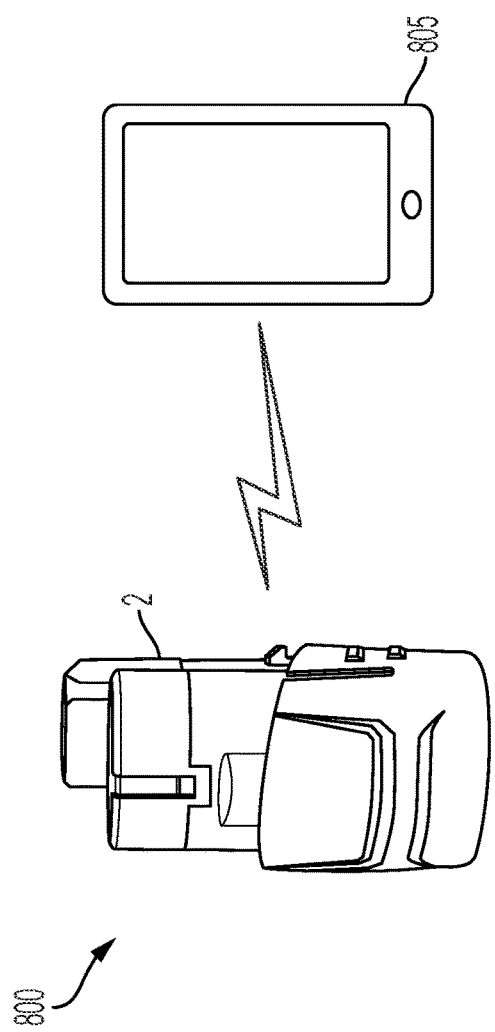
FIG. 13A is a communication network for the battery pack of FIG. 1A and an external device, according to some embodiments.

FIG. 1A illustrates a battery pack 2 for providing power to and communicating with a heated garment, such as heated jacket 10 (FIG. 2) and/or heated glove 50 (FIG. 4) and communicating with an external device, such as external device 805 (FIG. 13A). The battery pack 2 includes a housing 4 and an interface portion 6 for connecting the battery pack 2 to a heated garment (e.g., the heated jacket 10 and/or heated glove 50). Additionally or alternatively, in some embodiments, the battery pack 2 may be configured to wirelessly provide power to the heated garment. For example, the interface portion 6 may include inductors or other wireless charging circuitry that can wirelessly provide power to a heated garment with wireless power capabilities. In some embodiments, the battery pack 2 includes a connection port for input power to charge rechargeable battery cells withing the housing 4. For example, the connection port may be one of a Universal Serial Bus (USB), Universal Serial Bus Type-C (USB-C), or a Universal Serial Bus Power Delivery (USB-PD) port.

In some embodiments, the battery pack 2 includes lithium ion battery cells. In other embodiments, the battery pack 2 may be of a different chemistry, for example, nickel-cadmium, nickel-metal hydride, and the like. In some embodiments, the battery pack 2 may include two large 10 ampere-hours (A/hr), 3.7 volt (V) battery cells. These larger-sized battery cells provide an increased runtime in comparison to conventional battery cells. In some embodiments, the battery cells may be 74 watts-hour (W/hr) battery cells. In some embodiments, the increase in W/hr of the battery cells would proportionally increase the runtime. For example, doubling the W/hr would double the runtime. In some embodiments, the density of the battery cells may be increased from conventional densities.

In the illustrated embodiment, the battery pack 2 is a 12V battery pack outputting a constant 12V output. In other embodiments, the output voltage level of the battery pack 2 may be different. For example, the battery pack 2 can be a 4V battery pack, 28V battery pack, 40V battery pack, or another voltage. The battery pack 2 may also have various capacities (e.g., 3, 4, 5, 6, 8, or 12 A/hr).

Figure 16:
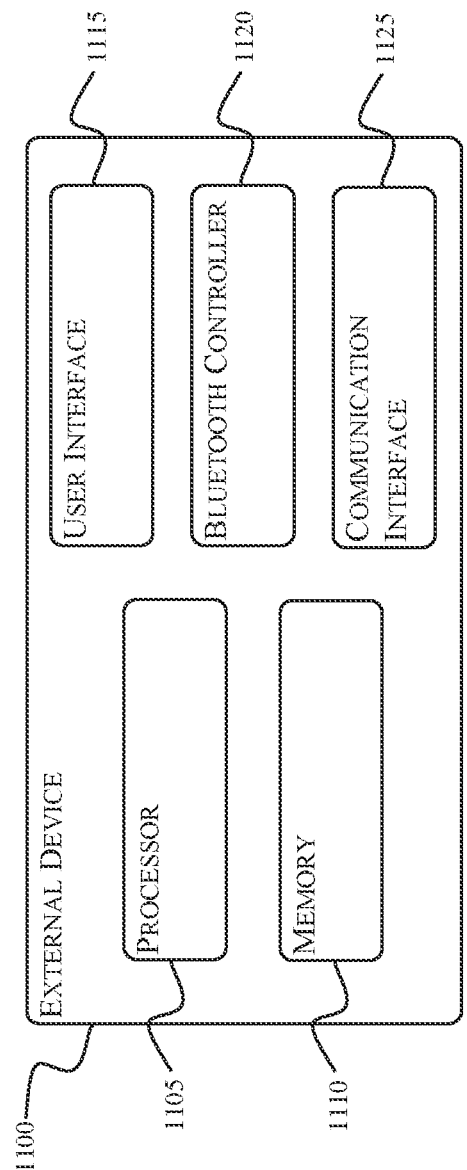
FIG. 16 is a block diagram of an external device, according to some embodiments.

In some embodiments, the interface portion 6 may include a connector, such as connectors 400, 450, 460, 470 (FIGS. 8A-8D). In some embodiments, the battery pack 2 also includes data terminals coupled to a control unit, such as controller 100 (FIG. 5), to communicate with the heated garment. In some embodiments, the battery pack 2 includes a Bluetooth® controller, such as Bluetooth® controller 115 (FIG. 5), that may wirelessly communicate with a Bluetooth® controller of the external device 805, 1100, such as Bluetooth® controller 1120 (FIG. 16).

Figure 1B:
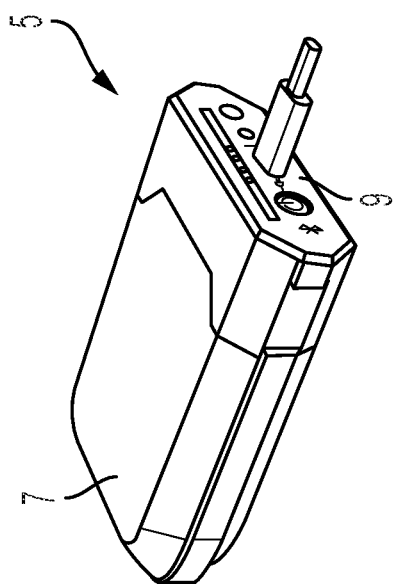
FIG. 1B illustrates a battery pack for communicating with and powering a heated garment. according to some embodiments.

FIG. 1B illustrates a second battery pack 5 for providing power to and communicating with a heated garment, such as heated jacket 10 (FIG. 2) and/or heated glove 50 (FIG. 4) and communicating with an external device, such as external device 805 (FIG. 13A). The battery pack 5 includes a housing 7 and an interface portion 9 for connecting the battery pack 5 to a heated garment. The battery pack 5 may include at least one connection port for input power to charge rechargeable battery cells withing the housing 7. For example, the connection port may be one of a Universal Serial Bus (USB), Universal Serial Bus Type-C (USB-C), or a Universal Serial Bus Power Delivery (USB-PD) port. In some embodiments, the connection portion may include a charging port for charging external devices.

In some embodiments, the battery pack 5 includes lithium ion battery cells. In other embodiments, the battery pack 2 may be of a different chemistry, for example, nickel-cadmium, nickel-metal hydride, and the like. In some embodiments, the battery pack 5 may include anywhere in the range of three to six battery cells. In the illustrated embodiment, the battery pack 5 is a 12V battery pack outputting a constant 12V output. In other embodiments, the output voltage level of the battery pack 5 may be different. For example, the battery pack 5 can be a 4V battery pack, 28V battery pack, 40V battery pack, or another voltage. The battery pack 5 may also have various capacities (e.g., 3, 4, 5, 6, 8, or 12 A/hr).

In some embodiments, the interface portion 9 may include a connector, such as connectors 400, 450, 460, 470 (FIGS. 8A-8D). In some embodiments, the battery pack 5 also includes data terminals coupled to a control unit, such as controller 100 (FIG. 5), to communicate with the heated garment. In some embodiments, the battery pack 5 includes a Bluetooth® controller, such as Bluetooth® controller 115 (FIG. 5), that may wirelessly communicate with a Bluetooth® controller of the external device 805, 1100, such as Bluetooth® controller 1120 (FIG. 16).

Figure 2:
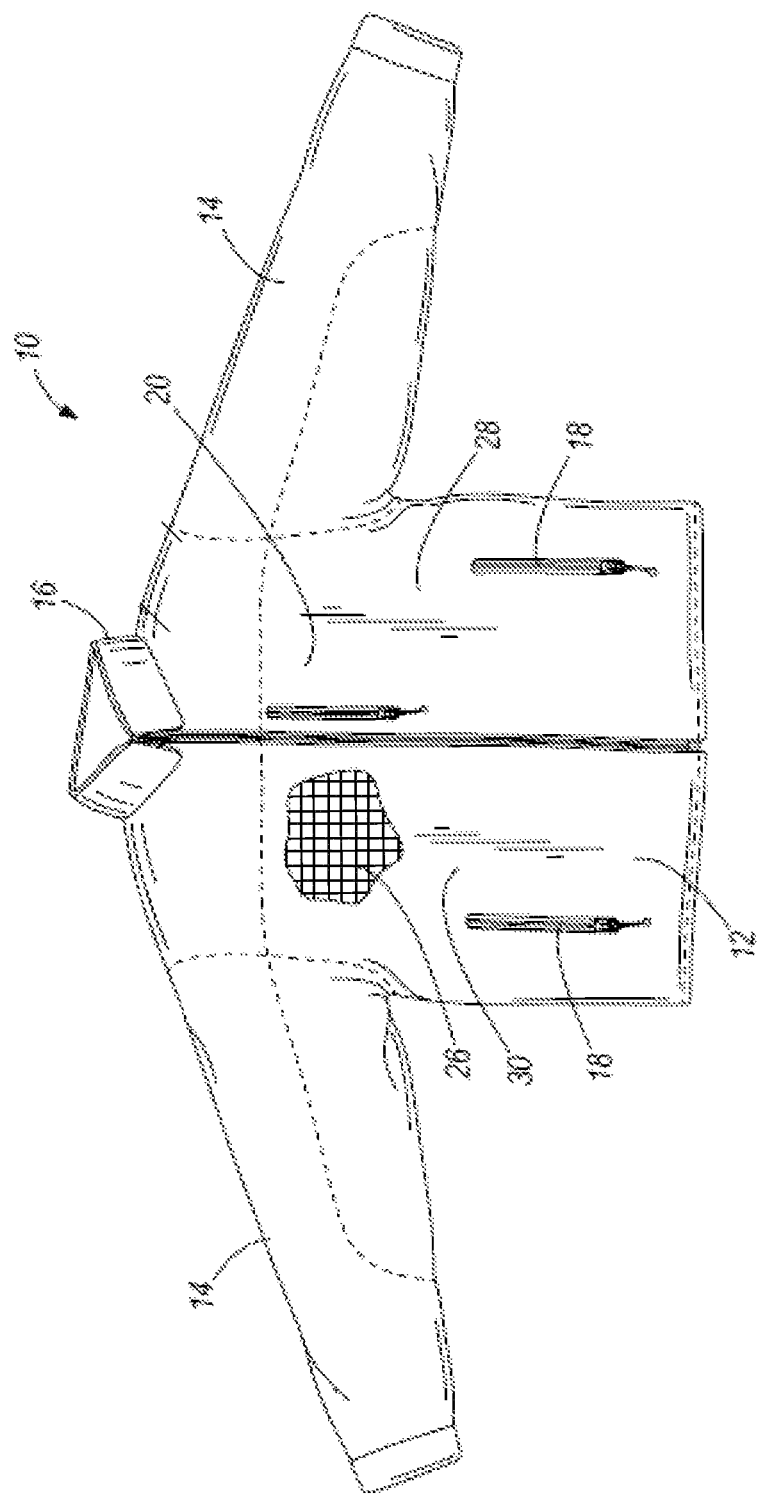
FIG. 2 illustrates a front view of a heated garment, according to some embodiments.

FIG. 2 illustrates a heated garment 10. The illustrated heated garment 10 is a jacket. The jacket 10 may be constructed in various sizes to fit a variety of users. The jacket 10 includes typical jacket features such as a torso body 12, arms 14, a collar 16, and front pockets 18. As illustrated in cutaway portions of FIGS. 2 and 3, the jacket 10 includes a heater array 26. The heater array 26 is disposed in both a left portion 28 and a right portion 30 of the torso body 12. In some embodiments, the heater array 26 may extend into the arms 14 and/or collar 16. The heater array 26 may be configured to generate heat based on a received DC voltage from the battery pack 2. For example, the heater array 26 may be a resistive heater array. However, other heater array types are also contemplated. In other embodiments, the jacket 10 may include a first heater array and second heater array arranged as an upper module and a lower module, respectively. In the illustrated embodiment, the heater array 26 is controlled by the battery pack 2, 5 based on input from the external device 805. In other embodiments, multiple heater arrays may be controlled individually via a single control input or multiple control inputs. For example, the multiple heater arrays may be isolated and controlled by the battery pack 2, 5 based on input from the device. The heater array 26 may include resistive heating coils formed of carbon fibers, high density carbon fibers, or other heating devices. The heated jacket 10 is capable of maintaining a temperature of up to 110 degrees Fahrenheit, although in other embodiments, lower or greater temperatures are possible depending upon the heat source.

In some embodiments, the heater array 26 may include a negative temperature coefficient thermistor (NTC) or a positive temperature coefficient thermistor (PTC) to determine temperature. For example, the NTC or PTC would be added to the heater array to determine the heater temperature. In some embodiments where a carbon fiber heater is implemented in the heated garment, an NTC or PTC may be required. The NTC or PTC may be added to the heater on or close to the carbon fiber element and the garment ambient. In some embodiments where a conductive ink heater is implemented in a heated garment, the current required to provide heat to the heater array may be determined by a current sensor. For example, a PTC heater may be used such that the current reduces as the temperature of the heater increases. The method of using a feedback loop to automatically adjust the temperature of heated garment will be discussed below with respect to FIG. 10.

Figure 3:
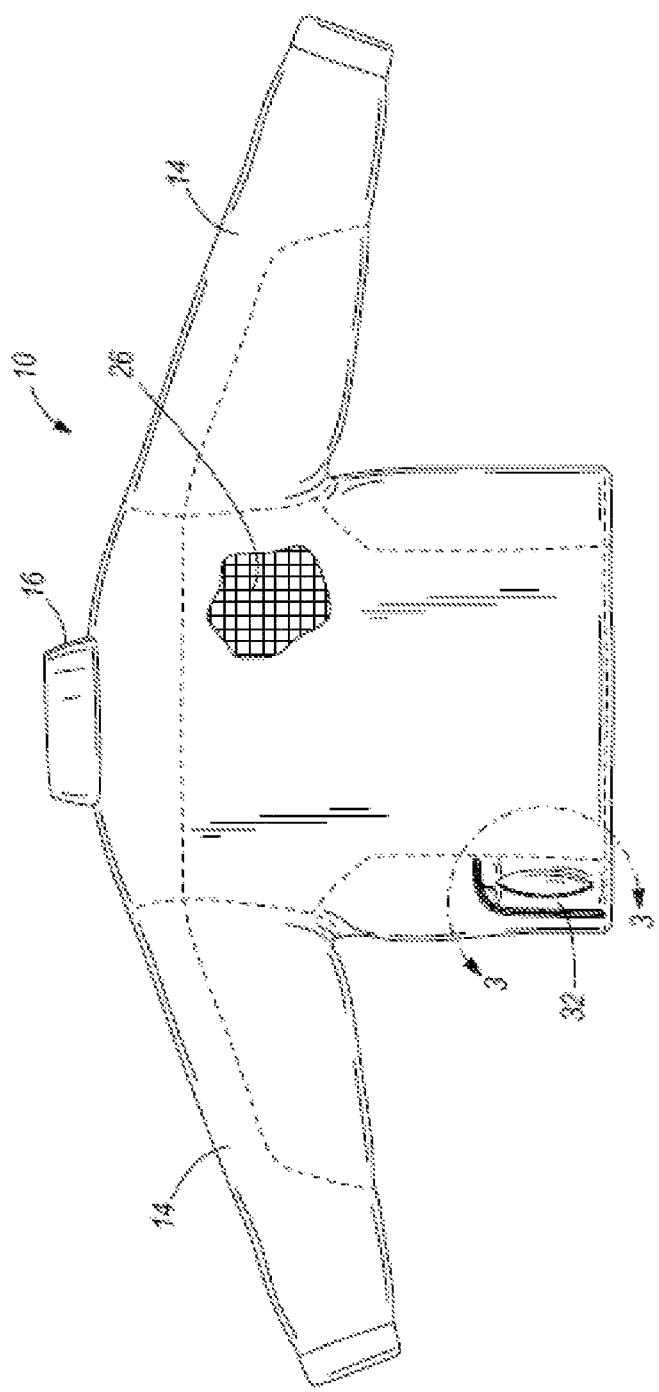
FIG. 3 illustrates a back view of a heated garment, according to some embodiments.

As illustrated in cutout 3-3 of FIG. 3, the heated jacket 10 includes a compartment 32 located on a lower portion of the back torso body. The compartment 32 houses an electrical component, such as a battery pack 2, 5, and battery holder that holds the battery pack 2, 5. The heated jacket 10 includes a connection port for connecting to the battery pack 2,5.

Figure 5:
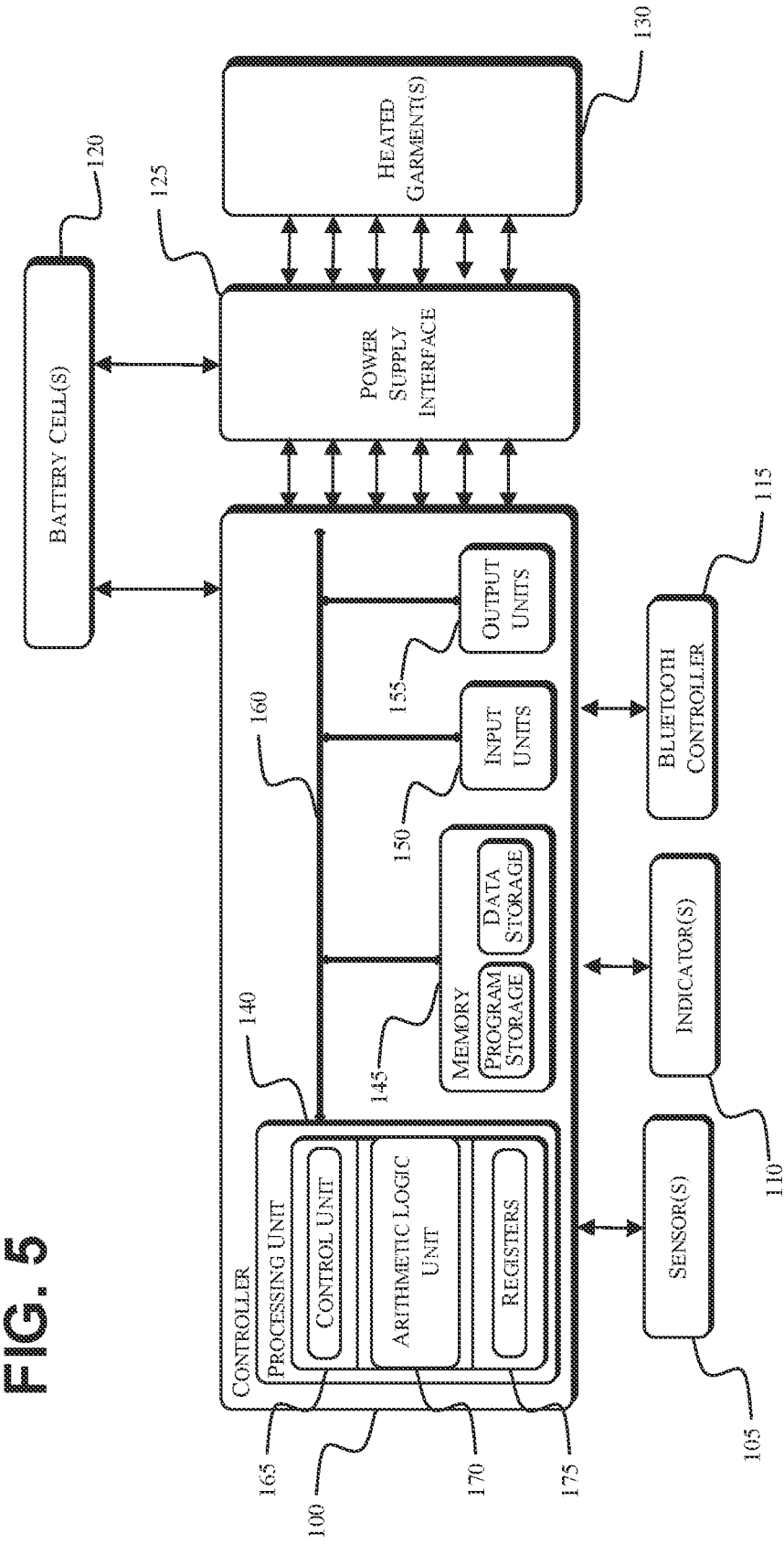
FIG. 5 is a block control diagram of the battery pack of FIG. 1, according to some embodiments.
Figure 6:
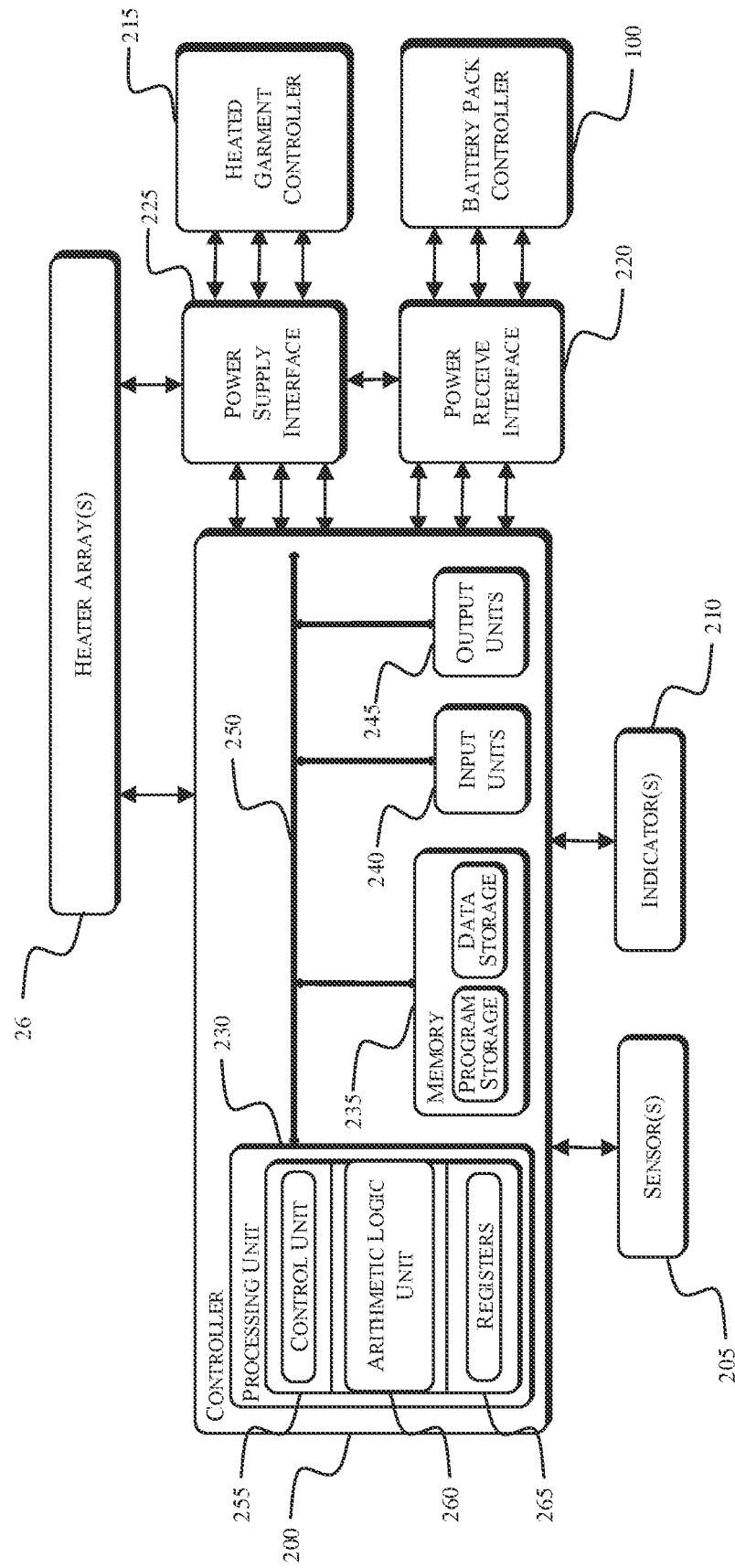
FIG. 6 is a block control diagram of a heated garment, according to some embodiments.

In some embodiments, the heated jacket 10 may include a controller, such as controller 200 (FIG. 6). The controller 200 may communicate with a battery pack controller, such as controller 100 (FIG. 5). In some embodiments, the heated jacket 10 may include at least one connection port for connecting to other heated garments. For example, the connection port(s) may be a USB, USB-C, or USB-PD port. The connection port(s) may be located on the torso body 12, arms 14, and/or collar 16 of the heated jacket 10. Garments connected to the heated jacket 10 via the connection port may receive input power from the battery pack 2, 5 and be controlled by the battery pack 2, 5 (specifically, by the battery pack controller 100) that is connected to the heated jacket 10.

Figure 4:
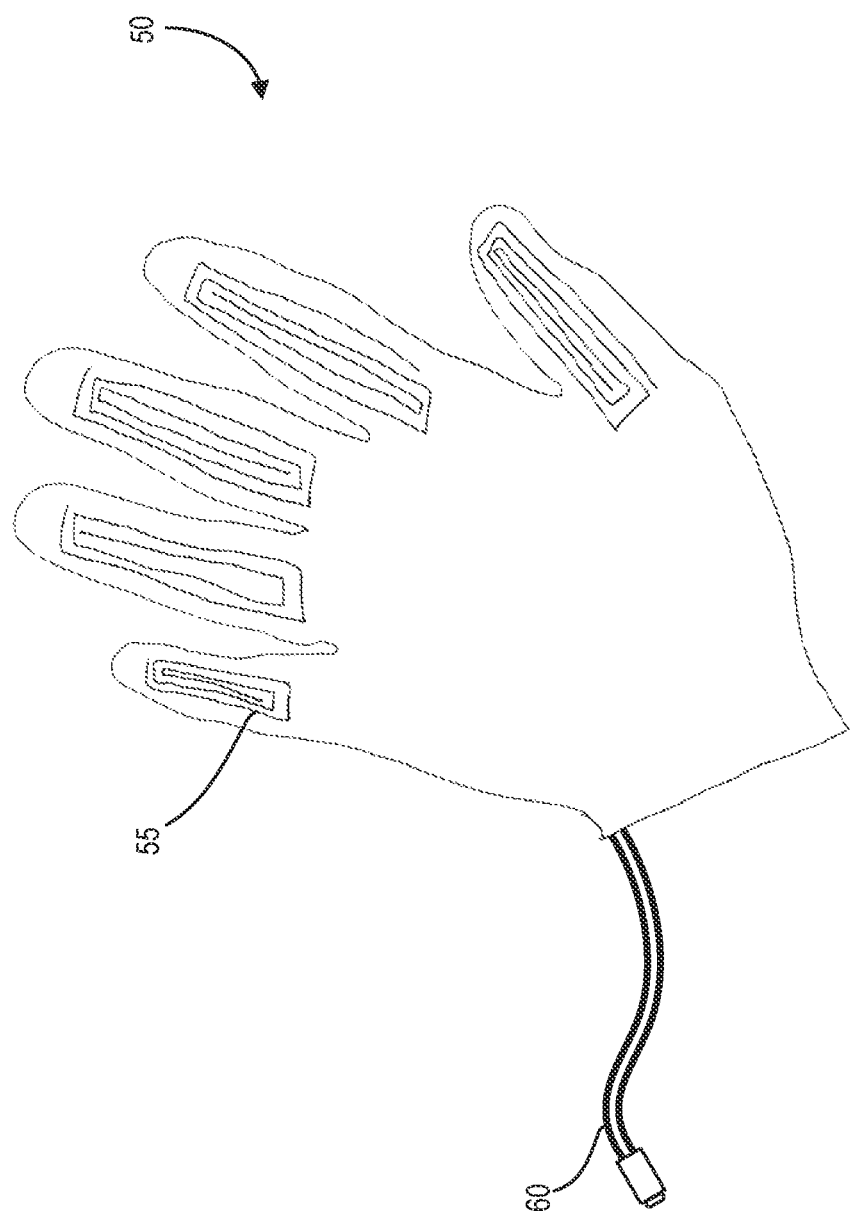
FIG. 4 illustrates another heated garment, according to some embodiments.

FIG. 4 illustrates another heated garment 50. The illustrated heated garment 50 is a heated glove. The heated glove 50 includes a heater array 55 and a connector 60. For example, the connector 60 may be a USB, USB-C, or USB-PD plug. The connector 60 may electrically and communicatively couple the heated glove 50 to the heated jacket 10 via the connection port of the heated jacket 10. The heater array 55 may be powered and controlled by the battery pack 2, 5 that is coupled to the heated jacket 10. For example, the heater array 55 may be able to provide varying heating levels to a user wearing the heated glove 50 based on input from the battery pack 2, 5 that receives input from the external device, such as external device 805 (FIG. 13A). In some embodiments, the heated glove 50 may be a mitten.

A controller 100 for the battery pack 2, 5 is illustrated in FIG. 5. The controller 100 is electrically and/or communicatively connected to a variety of modules or components of the battery pack 2, 5. For example, the illustrated controller 100 is connected to sensors 105 (which may include, for example, current sensors, voltage sensors, temperature sensor, etc.), indicators 110, a Bluetooth® controller 115, battery cell(s) 120, and a power supply interface 125.

The controller 100 includes a plurality of electrical and electronic components that provide power, operational control, and protection to the components and modules within the controller 100 and/or battery pack 2, 5. For example, the controller 100 includes, among other things, a processing unit 140 (e.g., a microprocessor, an electronic processor, an electronic controller, a microcontroller, or another suitable programmable device), a memory 145, input units 150, and output units 155. The processing unit 140 includes, among other things, a control unit 165, an arithmetic logic unit ("ALU") 170, and a plurality of registers 175 (shown as a group of registers in FIG. 5), and is implemented using one or more computer architectures (e.g., a modified Harvard architecture, a von Neumann architecture, etc.). The processing unit 140, the memory 145, the input units 150, and the output units 155, as well as the various modules connected to the controller 100 are connected by one or more control and/or data buses (e.g., common bus 160). The control and/or data buses are shown generally in FIG. 5 for illustrative purposes. The use of one or more control and/or data buses for the interconnection between and communication among the various modules and components would be known to a person skilled in the art in view of the embodiments described herein.

The memory 145 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 140 is connected to the memory 145 and executes software instruction that are capable of being stored in a RAM of the memory 145 (e.g., during execution), a ROM of the memory 145 (e.g., on a generally permanent basis), or another non-transitory computer readable medium such as another memory or a disc. Software included in the implementation of the battery pack 2, 5 can be stored in the memory 145 of the controller 100. The software includes, for example, firmware, one or more applications, program data, filters, rules, one or more program modules, and other executable instructions. The controller 100 (e.g., the electronic processor 140) is configured to retrieve from the memory 145 and execute, among other things, instructions related to the control processes and methods described herein. In other embodiments, the controller 100 includes additional, fewer, or different components.

The indicators 110 receive control signals from the controller 100 to turn ON and OFF or otherwise convey information based on different states of the battery pack 2, 5. For example, the indicators 110 may display the power level of the battery cells 120, that the Bluetooth® controller 115 is paired with an external device 805, or that the Bluetooth® controller 115 is transmitting and/or receiving information from the external device 805. The indicators 110 include, for example, one or more light-emitting diodes (LEDs), or a display screen (e.g., an LCD display). The display/indicator(s) 115 may also include additional elements to convey information to a user through audible or tactile outputs (e.g., a speaker). The display/indicator(s) 115 may also be referred to as an output device configured to provide an output to a user.

Figure 12:
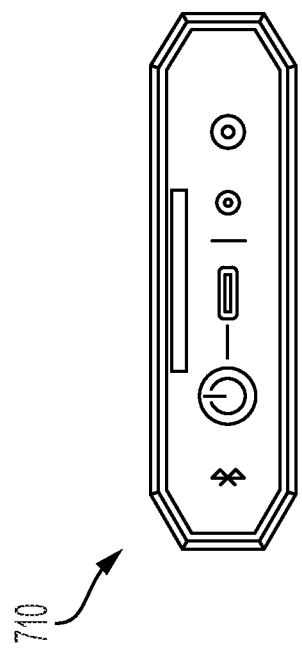
FIG. 12 illustrates a user interface for the battery pack of FIG. 1B, according to some embodiments.
Figure 15:
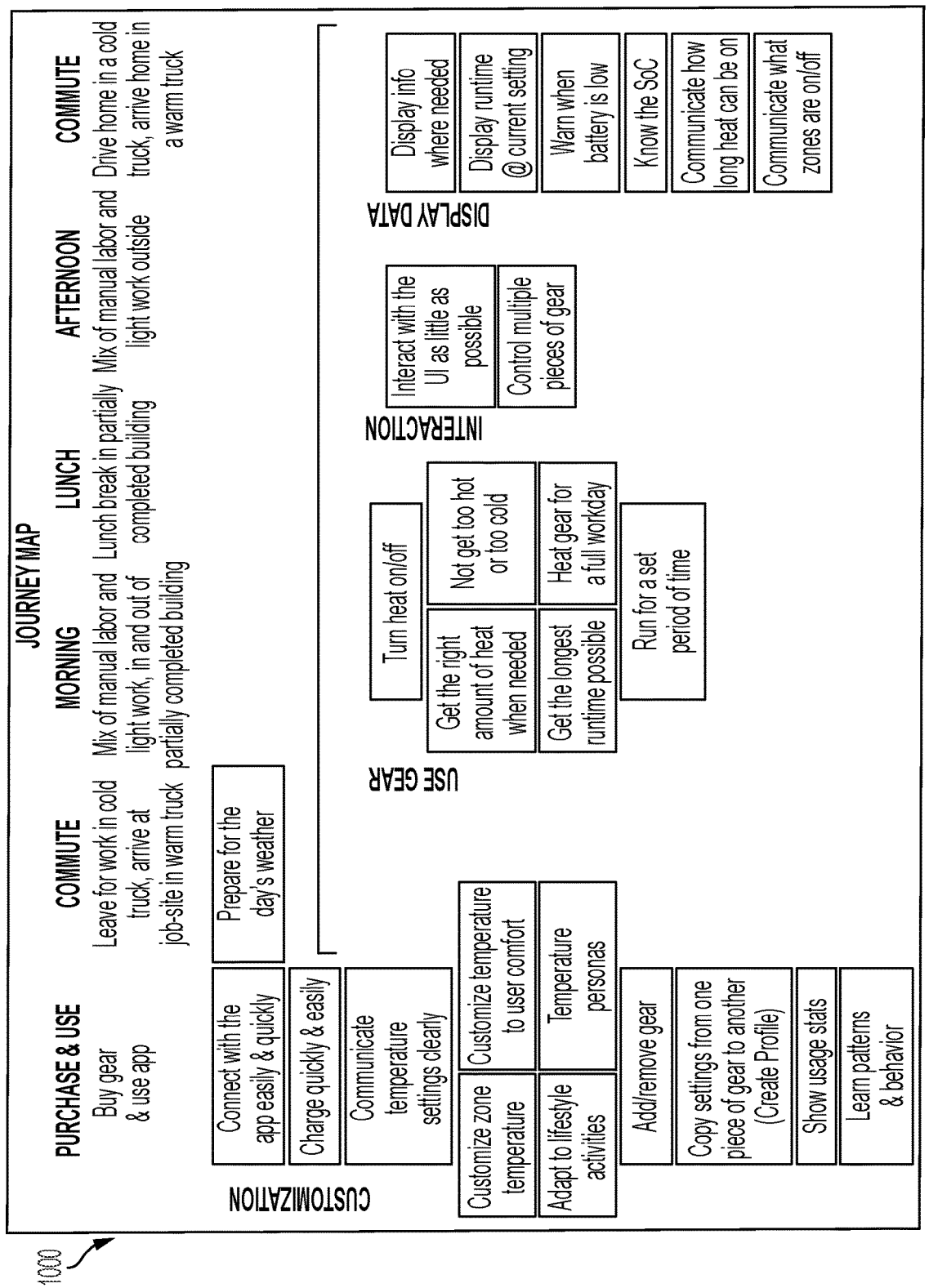
FIG. 15 illustrates a journey map showing an example journey of the heated garment, according to some embodiments.

The Bluetooth® controller 115, or wireless controller, includes a transceiver that communicates with a Bluetooth® enabled device, such as external device 805, 1100 (FIG. 12, FIG. 15, respectively). The Bluetooth® controller 115 may transmit information regarding components of the battery pack 2, 5, a status of the battery pack 2, 5, and/or information about the heated garment. For example, the Bluetooth® controller 115 may transmit information such as the temperature of the heating zones, the type of heated garment coupled to the battery pack 2, 5, heating zones, and/or preset information to the device by communicating with the Bluetooth® controller of the device, such as Bluetooth® controller 1120 (FIG. 16). The Bluetooth® controller 115 may receive control signals from the external device 805, 1100. For example, the control signals may include temperature set points, heating zones to activate/deactivate, and heater array runtime. In some embodiments, the Bluetooth® controller 115 communicates with the external device 805, 1100 employing the Bluetooth® protocol. Therefore, in some embodiments, the external device 805, 1100 and the battery pack 2, 5 are within a communication range (i.e., in proximity) of each other while they exchange information.

The power supply interface 125 is connected to the controller 100 and couples to heated garments 130 (e.g., heated jacket 10 and/or heated glove 50). The power supply interface 125 includes a combination of mechanical (e.g., interface portion 6, 9 (FIG. 1A, 1B, respectively)) and electrical components configured to and operable for interfacing (e.g., mechanically, electrically, and communicatively connecting) the battery pack 2, 5 with the heated garments 130. The power supply interface 125 transmits the power from the battery cells 120 to the heated garments 130. The power supply interface 125 includes active and/or passive components (e.g., voltage step-down controllers, voltage converters, rectifiers, filters, etc.) to regulate or control the power transmitted to the heated garments 130.

The controller 100 may dynamically adjust the heating level of a heated garment that is connected to the controller 100 via the power supply interface. For example, based on an input received from the external device via the Bluetooth® controller 115 (e.g., a requested runtime of the heater array 26 in the heated jacket 10) and the amount of power left in the battery cells 120, the controller 100 may adjust the heating level of the heater array 26 to be able to operate the heater array for the requested runtime. In the case that a heated garment, such as heated glove 50, is coupled to the heated jacket 10, the controller 100 may further dynamically adjust the heating levels of the heater array 26 and the heater array 55 to be able to operate the heater arrays 26, 55 for the requested runtime.

The controller 100 may also adjust specific heating zones of the heated garment, such as the heated jacket 10 (FIG. 2). A user may adjust which heat zones of the heated garment are active on the external device. The device communicates the heating zones that are to be active to the controller 100 via the Bluetooth® controller 115. For example, the user may adjust for various heat settings in different zones. Heat settings may include heating level of the heating zones and the time that the heating zone is active. For example, the heater array located on the front of the heated jacket 10 may be separately controlled from the heater array located on the back of the heated jacket 10. As such, the user may adjust, via the external device, the heating level of the front heater array while maintaining the heating level of the back heater array. The controller 100 receives the adjustment by the user via the Bluetooth® controller 115 and controls the heater arrays accordingly.

In some embodiments, the controller 100 may receive input from a current sensor. The current sensor may receive a signal from the heater array of the heated garment. For example, the current of the heater may decrease as the temperature of the heater increases. Based on the sensed current and thus the sensed temperature, the temperature of the heaters may be automatically adjusted to a preset temperature. For example, the battery pack 2, 5 will have an extended life in warmer environments since less heat is needed. The controller 100 may adjust the temperature of the heaters based on the ambient temperature and/or the determined temperature of the heater.

In some embodiments, the controller 100 includes a feedback loop that automatically adjusts the temperature of the heated garment without input from a user via the external device. For example, the feedback loop may automatically adjust the heating levels of the heated garment when the heated garment is heated to a predetermined temperature. A feedback control method will be described below with respect to FIG. 10.

In some embodiments, the controller 100 may be able to determine the ambient temperature surrounding the user wearing the heated garment. The ambient temperature may be used by the controller 100 to adjust the temperature settings of the heated garment or to adjust the way the controller 100 reacts. The ambient temperature could be used so that the garment is always a predetermined temperature above the external temperature. The predetermined temperature could be, for example, 10 degrees Fahrenheit, 20 degrees Fahrenheit, and the like. In some embodiments, the predetermined temperature may be different for different levels of external temperature. For example, for very cold external temperatures (e.g., <32 degrees Fahrenheit), the predetermined temperature could be 20 degrees Fahrenheit or more. For less cold external temperatures (e.g., >32 degrees Fahrenheit), the predetermined temperature could be 10 degrees or less. Increasing the heater temperature as the ambient temperature drops would help maintain a feeling of warmth for the user wearing the heated garment, even at a colder temperature. Conventionally, the heater is trying to reach the same temperature regardless of the outside temperature, requiring more power when it is cold. The controller 100 could detect when a user wearing the heated garment has entered a warmer environment and automatically adjust the temperature of the heated garment to avoid the user from overheating.

In some embodiments, the controller 100 may be configured to create bursts of warmth. For example, the controller 100 may be configured to create peaks and valleys in a temperature profile by doing one of varying a duty cycle of a pulse-width modulation (PWM) signal of the heater array 26 or enabling the heater array 26 for a first predetermined time and then disabling the heater array 26 for a second predetermined time. For example, the user wearing the heated garment would feel periods of warmth. Rather than a body becoming adapted to the temperature, the heated garment would create increases in heat which would make the user feel warmer. Human bodies try to maintain a constant temperature by regulating a sweat rate. Creating peaks and valleys in the temperature profile may trick the body into not increasing the sweat rate to cool down.

A controller 200 for a heated garment is illustrated in FIG. 6. The controller 200 is electrically and/or communicatively connected to a variety of modules or components of the heated garment, such as heated jacket 10 (FIG. 2). For example, the illustrated controller 200 is connected to sensors 205 (which may include, for example, current sensors, voltage sensors, temperature sensor, timers etc.), indicators 210, heater arrays 26, a power receive interface 220, and a power supply interface 225.

The controller 200 includes a plurality of electrical and electronic components that provide power, operational control, and protection to the components and modules within the controller 200 and/or heated garment. For example, the controller 200 includes, among other things, a processing unit 230 (e.g., a microprocessor, an electronic processor, an electronic controller, a microcontroller, or another suitable programmable device), a memory 235, input units 240, and output units 245. The processing unit 230 includes, among other things, a control unit 255, an arithmetic logic unit ("ALU") 260, and a plurality of registers 265 (shown as a group of registers in FIG. 2), and is implemented using one or more computer architecture (e.g., a modified Harvard architecture, a von Neumann architecture, etc.). The processing unit 230, the memory 235, the input units 240, and the output units 245, as well as the various modules connected to the controller 200 are connected by one or more control and/or data buses (e.g., common bus 250). The control and/or data buses are shown generally in FIG. 6 for illustrative purposes. The use of one or more control and/or data buses for the interconnection between and communication among the various modules and components would be known to a person skilled in the art in view of the embodiments described herein.

The memory 235 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 230 is connected to the memory 235 and executes software instruction that are capable of being stored in a RAM of the memory 235 (e.g., during execution), a ROM of the memory 235 (e.g., on a generally permanent basis), or another non-transitory computer readable medium such as another memory or a disc. Software included in the implementation of the heated garment can be stored in the memory 235 of the controller 200. The software includes, for example, firmware, one or more applications, program data, filters, rules, one or more program modules, and other executable instructions. The controller 200 is configured to retrieve from the memory 235 and execute, among other things, instructions related to the control processes and methods described herein. In other embodiments, the controller 200 includes additional, fewer, or different components.

The indicators 210 receive control signals from the controller 200 to turn ON and OFF or otherwise convey information based on different states of the heated garment. For example, the indicators 210 may display that the heater array 26 is ON, that the battery pack 2 is out of power, etc. The indicators 210 include, for example, one or more light-emitting diodes (LEDs), or a display screen (e.g., an LCD display). The display/indicator(s) 215 may also include additional elements to convey information to a user through audible or tactile outputs (e.g., a speaker). The display/indicator(s) 210 may also be referred to as an output device configured to provide an output to a user.

The power receive interface 220 is connected to the controller 200 and couples to the battery pack controller 100 to receive power from the battery pack 2, 5. The power receive interface includes a combination of mechanical (e.g., a connection port) and electrical components configured to and operable for interfacing (e.g., mechanically, electrically, and communicatively connecting) the heated garment with the battery pack 2, 5.

The power supply interface 225 is connected to the controller 200 and couples to a heated garment controller 215. In some embodiments, the heated garment controller 215 may include at least some of the same components as the controller 200. The heated garment controller 215 is within a heated garment, other than the heated garment including controller 200. For example, the controller 200 may be included in the heated jacket 10 (FIG. 2) and the heated garment controller 215 may be included in the heated glove 50 (FIG. 4). The power supply interface 225 includes a combination of mechanical (e.g., a connection port) and electrical components configured to and operable for interfacing (e.g., mechanically, electrically, and communicatively connecting) the heated garment with another heated garment.

Figure 7:
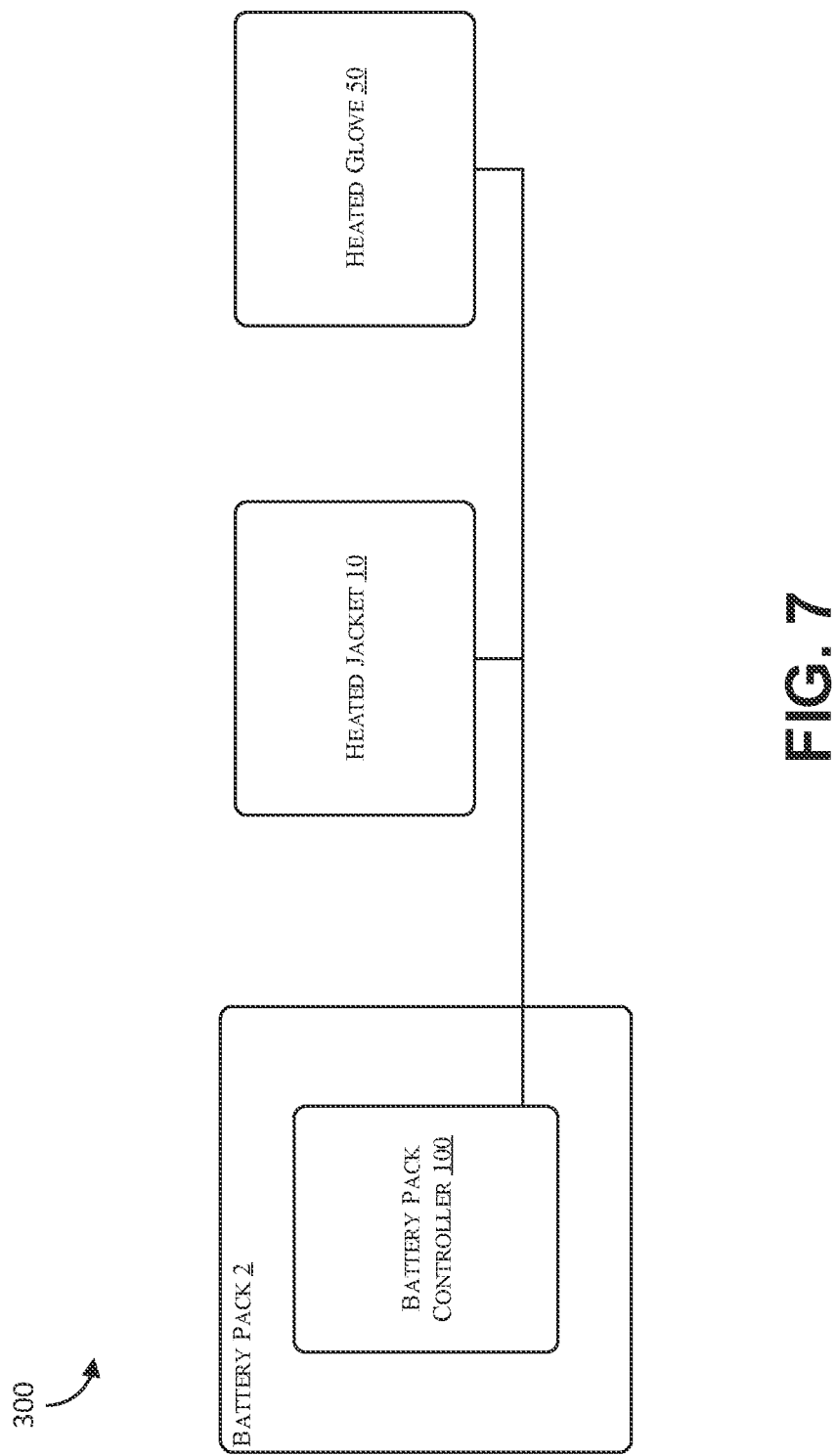
FIG. 7 is a block diagram of a battery pack communication with heated garments, according to some embodiments.

FIG. 7 is a block diagram 300 of the battery pack 2 communicating with heated garments, including the heated jacket 10 and the heated glove 50. The battery pack of FIG. 7 is illustrated by battery pack 2, however, battery pack 5 may substituted for battery pack 2. In some embodiments, the battery pack 2 is controlled by an external device, such as device 805, 1100 (FIG. 13A, FIG. 16, respectively). For example, the device may be a mobile phone, tablet, or computer that has Bluetooth® or other wireless capabilities. In particular, the battery pack controller 100 communicates with the controllers of the heated garments, such as controller 200 and heated garment controller 215 (FIG. 6). The battery pack controller 100 may send information to the device by the Bluetooth® controller 115 communicating with a Bluetooth® controller of the device, such as Bluetooth® controller 1120 (FIG. 16). For example, the battery pack 2 may communicate the current state of charge and/or the overall capacity of the battery pack 2 to the device using Bluetooth®.

When the battery pack 2 is connected to the heated jacket 10 and the heated glove 50, the battery pack 2 may communicate to the external device what garments are connected to the battery pack 2. A user may interface with the external device to control aspects of the heated garments when the heated garments are connected to the battery pack 2, via the Bluetooth® controller 115. In some embodiments, the device may include an application that provides a graphical user interface (FIGS. 14A-14M) that controls the battery pack 2 and the heated garments. For example, the user may adjust heat settings (e.g., heating levels, heating zones, runtime, etc.) of the heated garments via the application on the device. The adjusted heat settings are communicated to the battery pack 2 via the Bluetooth® controller 115 which then controls the heated garments through the power supply interface 125.

In addition to controlling the heated garments through the power supply interface 125, the controller 100 receives information on operating conditions of the heated garments. Controller 100 may receive temperature information (e.g., current temperature, set temperature, etc.), garment information (e.g., type of garment, serial number of the garment, unique identifier of the garment, etc.), zone information (e.g., which zones are active, how many zones, etc.), and preset information. The information is used by the controller 100 to determine the amount of power being consumed by the heated garments. In some embodiments, the information is communicated to the user via the application on the device such that the user may create a dynamic preset.

In some embodiments, the battery pack controller 100 adjusts multiple garments at once when heated garments are connected. For example, the controller 100 may communicate a temperature or adjust a temperature of the heated gloves 50 when the heated glove 50 is connected to the heated jacket 10. This allows for the controller 100 to determine a full amount of power drawn from the battery cells 120 of the battery pack 2. The controller 100 may also turn on and off multiple garments (e.g., the heated jacket 10 and the heated glove 50) at once when one of the heated garments is turned on or off. The controller 100 operates as a master controller and the heated garment controllers 200, 215 operate based on the controls sent from controller 100 (i.e., the garment controllers 200, 215 are slaves to the battery pack controller 100).

FIG. 8A illustrates a first dual connector 400 from a heated garment, such as heated jacket 10 (FIG. 2). The first dual connector 400 connects the battery pack 2, 5 to a plurality of different types of heated garments. In some embodiments, the first dual connector 400 extends as a wire from the heated jacket 10. The first dual connector 400 includes a dual barrel connection portion including a first connection portion 405 and a second connection portion 410. For example, the first connection portion 405 may be a barrel-style connector and the second connection portion 410 may be a USB-style connector. The first connection portion 405 communications data to the battery pack 2, 5 from the heated jacket 10 and the second connection portion 410 facilitates power from the battery pack 2, 5 to the heater array of the heated jacket 10.

FIG. 8B illustrates a first dual connector port 415 of a battery pack, such as battery pack 2, 5 (FIG. 1A, FIG. 1B, respectively). The first dual connector port 415 receives the first dual connector 400 from the heated jacket and facilitates an electrical connection between the battery pack 2, 5 and the heated jacket 10. The first dual connector port 415 includes a first port 420 and a second port 425. The first port 420 receives the first connection portion 405 and the second port 425 receives the second connection portion 410.

Figure 8D:
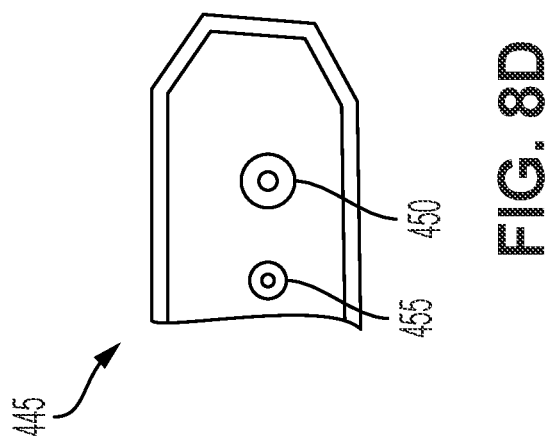
FIG. 8D illustrates a second dual connector port for the battery packs of FIGS. 1A & 1B, according to some embodiments.
Figure 8C:
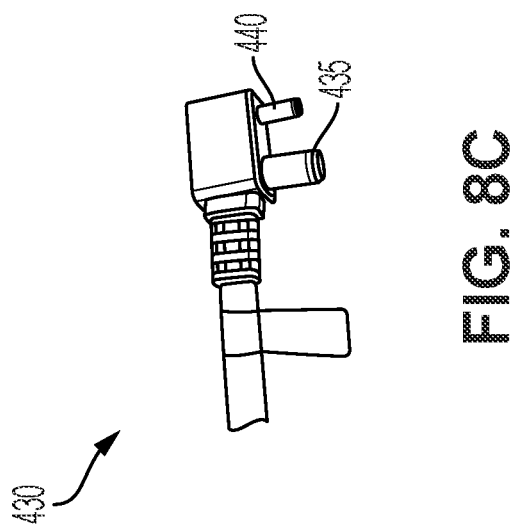
FIG. 8C illustrates a second dual connector from the heated garment of FIG. 2, according to some embodiments.

FIG. 8C illustrates a second dual connector 430 from a heated garment, such as heated jacket 10 (FIG. 2). The second dual connector 430 connects the battery pack 2, 5 to a plurality of different types of heated garments. In some embodiments, the second dual connector 430 extends as a wire from the heated jacket 10. The second dual connector 430 includes a dual barrel connection portion including a first connection portion 435 and a second connection portion 440. For example, the first connection portion 435 may be a barrel-style connector and the second connection portion 440 may also be a barrel-style connector that is larger in diameter than the first connection portion 435. The first connection portion 435 communications data to the battery pack 2, 5 from the heated jacket 10 and the second connection portion 440 facilitates power from the battery pack 2, 5 to the heater array of the heated jacket 10.

FIG. 8D illustrates a second dual connector port 445 of a battery pack, such as battery pack 2, 5 (FIG. 1A, FIG. 1B, respectively). The second dual connector port 445 receives the second dual connector 430 from the heated jacket and facilitates an electrical connection between the battery pack 2, 5 and the heated jacket 10. The second dual connector port 445 includes a first port 450 and a second port 455. The first port 450 receives the first connection portion 435 and the second port 455 receives the second connection portion 440.

The battery pack 2, 5 is compatible with a plurality of heated garments, regardless of the age of production of the garment. In embodiments where the heated garment does not include a controller, the battery pack controller 100 may only monitor the power in the battery cells 120 of the battery pack 2, 5. In embodiments where the heated garment does include a controller (e.g., heated jacket 10 including controller 200), the battery pack controller 100 is able to monitor the battery cells 120 and control the heated garment connected to the battery pack 2, 5. Dual connectors 400, 430 allow the battery pack 2 to be used with a plurality of different types of heated garments, both old and new.

Figure 9:
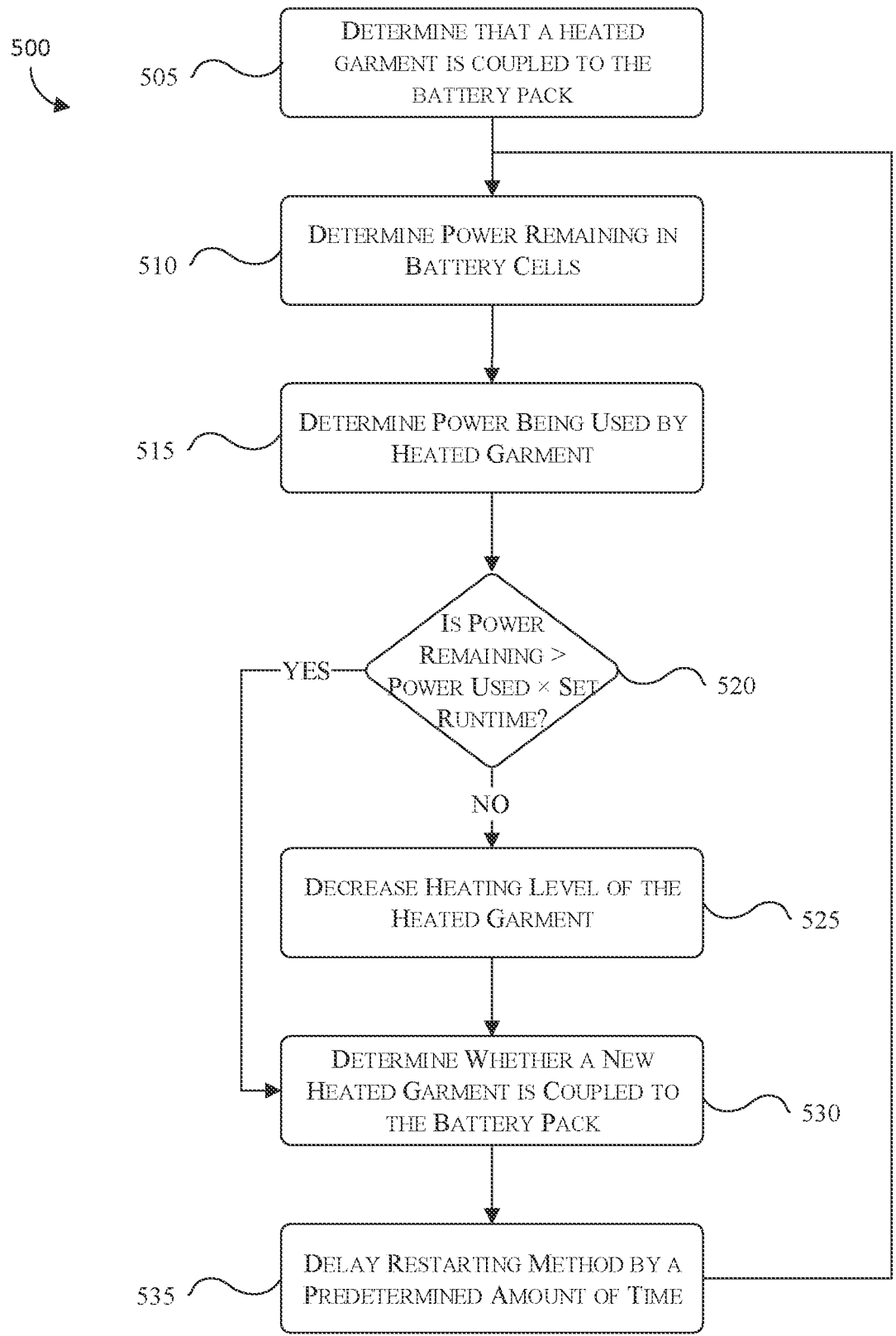
FIG. 9 is a block diagram of a method of operating the heated garment, according to some embodiments.

FIG. 9 is a method 500 of setting a time and automatically adjusting the power supplied to the heated garment by the battery pack 2 for that time. Although the illustrated method 500 include specific steps, not all of the steps need to be performed or need to be performed in the order presented. In some embodiments, the method 500 is executed by the battery pack controller 100. Additionally, although the illustrated method 500 is directed to the battery pack 2, battery pack 5 may also implement the method, via the battery pack controller 100.

The method 500 begins by the controller 100 determining that a heated garment is coupled to the battery pack 2 (step 505). For example, the controller 100 determines that the heated jacket 10 is coupled to the battery pack 2. In some embodiments, the controller 100 may determine that multiple heated garments have been coupled to the battery pack 2. In step 510, the controller 100 determines the power remaining in battery cells 120 of the battery pack 2. The power remaining may be dependent on the size of the battery cells 120. In step 515, the controller 100 determines the amount of power being used by the heated garment. For example, the heated jacket 10 may be heating a user using multiple heating zones at the highest heating level such that a high amount of power is drawn from the battery cells 120. In some embodiments, controller 100 determines the power being used by the heated garment based on a signal received from a current sensor.

In step 520, the controller 100 determines if the power remaining in the battery cells 120 is greater than the power used by the heated garment multiplied by a pre-set runtime. In some embodiments, the runtime is set by a user at the device 805 and communicated to the Bluetooth® controller 115 of the controller 100. If the power remaining in the battery cells at step 520 is determined to be less than the power required for the pre-set runtime, then the method 500 proceeds to step 525. In step 525, the controller 100 decreases the heating level of the heated garment. For example, the controller 100 may decrease the heating level from a high heating level to a medium heating level. The controller 100 decreases the heating level in order to ensure that the heated garment is able to heat a user for the required runtime. The method 500 proceeds from step 525 to step 530. If the power remaining in the battery cells 120 is greater than the power required for the pre-set runtime, then the method 500 proceeds to step 530.

In step 530, the controller 100 determines that a new heated garment is coupled to the battery pack 2. For example, the heated glove 50 may be coupled to the battery pack 2 via a mechanical and electrical coupling to the heated jacket 10. The controller 100 determines that a new heated garment has been received based on sensor signals. For example, the newly coupled heated garment may immediately draw power, thus, increasing the current sensed by the current sensor of the battery pack 2. Alternatively, the newly coupled heated garment may send a signal to the controller 100 when initially connected. In step 535, the controller 100 delays the method 500 from restarting for a predetermined amount of time. For example, the controller 100 may delay the method 500 from restarting (and proceeding back to step 505) for 1-10 seconds. In some embodiments, a new heated garment may not be coupled to the battery pack. In that case, the method still restarts (proceeds back to step 505) after a delay.

Figure 10:
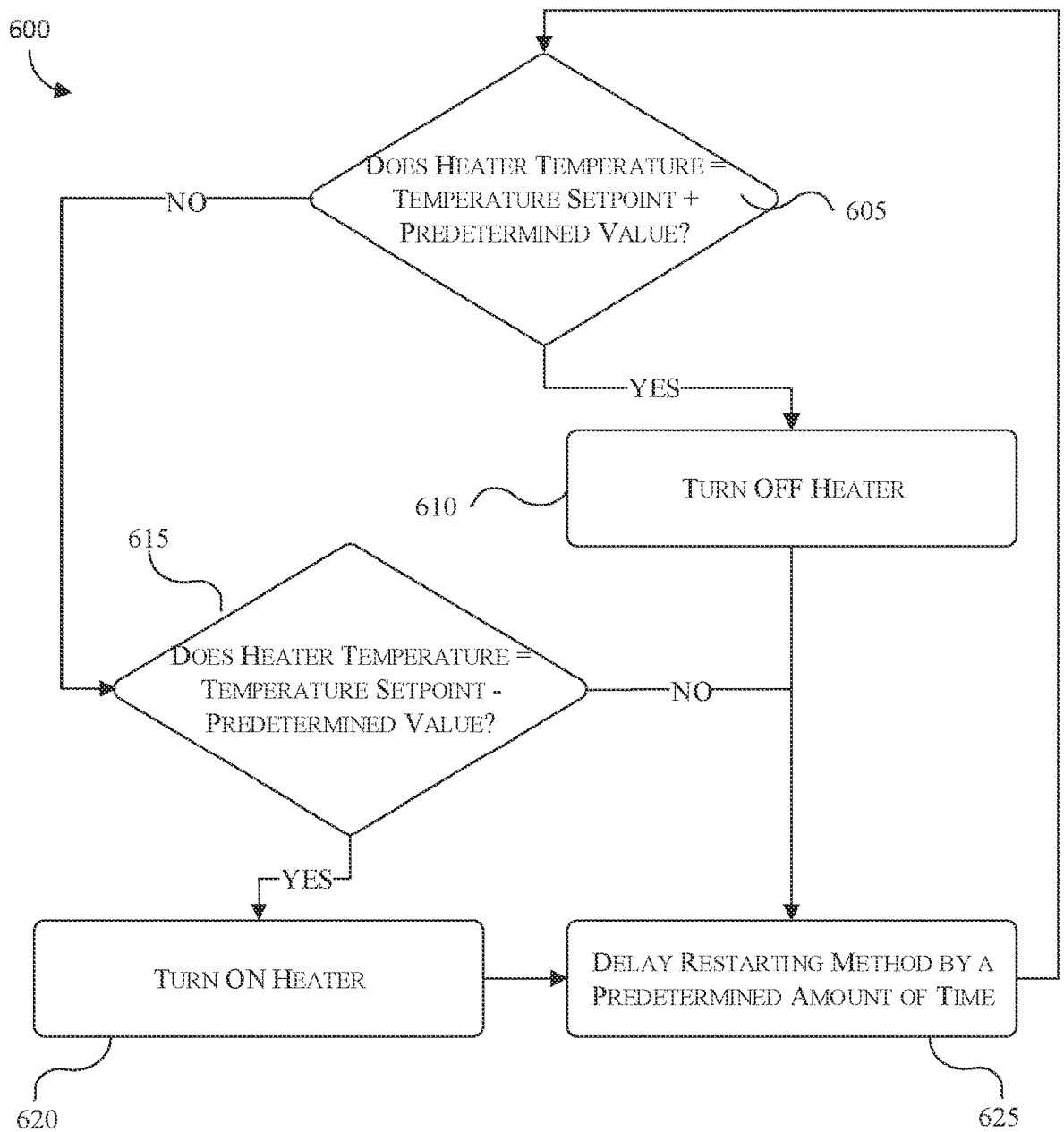
FIG. 10 is a block diagram of another method of operating the heated garment, according to some embodiments.

FIG. 10 is a method 600 of controlling the heater array 26 based on feedback from the heater array. Although the illustrated method 600 includes specific steps, not all of the steps need to be performed or need to be performed in the order presented. In some embodiments, the method 600 is executed by the battery pack controller 100.

In step 605, the controller 100 determines if the heater array 26 temperature is equal to a temperature setpoint plus a predetermined value. The temperature setpoint may be a heating level that a user specifies on an external device, such as external device 805. The predetermined value may be a buffer value. For example, the buffer value may be 0.5 degrees to 5 degrees, but preferably a value such that a wearer of the heated garment is unable to feel the heater array 26 turning ON and OFF in the event that the controller 100 turns the heater array 26 OFF. The buffer value ensures that the heater is not rapidly oscillating between an ON and OFF state by creating a window where the controller 100 does not perform any actions. In some embodiments, the buffer value may reduce an inrush current of the heater array 26 by reducing the overall number of times which the heater array 26 needs to be turned ON and OFF. If the heater array 26 temperature equals the temperature setpoint plus the predetermined value, then the method 600 proceeds to step 610. In step 610, the controller 100 turns the heater array 26 OFF. After step 610, the method 600 proceeds to step 625.

If the heater array 26 temperature does not equal the temperature setpoint plus the predetermined value, then the method 600 proceeds to step 615. In step 615, the controller 100 determines if the heater array 26 temperature is equal to the temperature setpoint minus the predetermined value. If the heater array 26 temperature is equal to the temperature setpoint minus the predetermined value, then the method 600 proceeds to step 620. In step 620, the controller 100 turns ON the heater array 26. If the heater array 26 temperature is not equal to the temperature setpoint minus the predetermined value, then the method 600 proceeds to step 625. In step 625, the controller 100 delays restarting the method 600 by a predetermined amount of time. For example, the controller 100 may delay the method 600 from restarting (and proceeding back to step 605) for 1-10 seconds.

Figure 11:
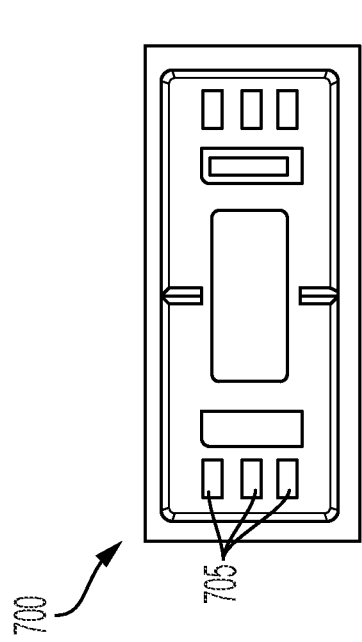
FIG. 11 illustrates a user interface for the heated garment of FIG. 2, according to some embodiments.

FIG. 11 illustrates a user interface 700 for a heated garment, such as the heated jacket 10 (FIG. 2). The user interface 700 includes lighting components 705, such as LEDs, that may change color and/or intensity. In some embodiments, the user interface 700 conveys information to a user wearing the heated jacket by changing color and/or intensity of the lighting components 705. For example, based on input from an external device, such as external device 805, the battery pack controller 100 may adjust heat settings of the heated jacket 10. The adjusted heat settings may be conveyed to the user via the user interface 700. For example, the lighting components 705 of the user interface 700 may turn OFF when the heater array 26 of the heated jacket 10 is turned OFF. As another example, the lighting components 705 may turn a first color (e.g., blue, green, etc.) when the heated jacket 10 has been set to a user preset that the user defines via the external device 805 and communicates to the controller 100 via the Bluetooth® controller 115. As another example, the lighting components 705 may turn to a second color (e.g., red, orange, etc.) when the heated jacket 10 is operated in a manual mode.

FIG. 12 illustrates a user interface 710 of a battery pack, such as battery pack 2, 5 (FIG. 1A, FIG. 1B (respectively)). The user interface includes interactive elements, such as buttons, that send a signal to the battery pack controller 100 to perform a function. For example, a power button may be pressed to power on the battery pack 2, 5. As another example, a Bluetooth® pairing button may be pressed to pair the battery pack 2, 5 with an external device, such as external device 805, via the Bluetooth® controller 115.

FIG. 13A illustrates a communication network 800. In some embodiments, the battery pack 2 communicates with an external device 805. In such embodiments, the battery pack 2 may include, for example, the Bluetooth® controller 115 described above which includes a transceiver to communicate with the external device 805 via, for example, a short-range communication protocol, such as Bluetooth®. The external device 805 may include a short-range transceiver, such as Bluetooth® controller 1120 (FIG. 16), to communicate with the battery pack 2, and may also include a long-range transceiver, such as communication interface 1125 (FIG. 16), to communicate with a server (not shown). In some embodiments, a wired connection (via, for example, a USB cable) is provided between the external device 805 and the battery pack 2 to enable direct communication between the external device 805 and the battery pack 2. Providing the wired connection may provide a faster and more reliable communication method between the external device 805 and the battery pack 2.

Figure 13B:
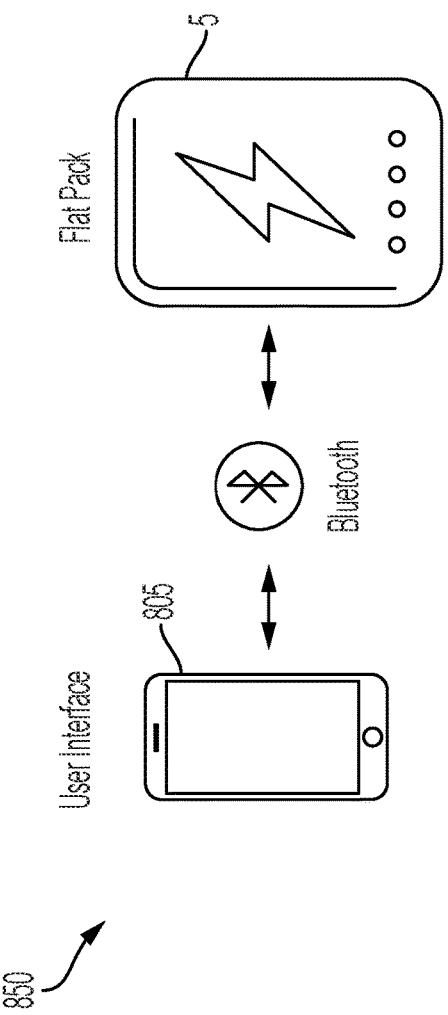
FIG. 13B is a communication network for the battery pack of FIG. 1B and an external device, according to some embodiments.

FIG. 13B illustrates a communication network 850. The battery pack 5 communicates with the external device 805, as shown in FIG. 13B. In such embodiments, the battery pack 5 may include, for example, the Bluetooth® controller 115 described above which includes a transceiver to communicate with the external device 805 via, for example, a short-range communication protocol, such as Bluetooth®. The external device 805 may include a short-range transceiver, such as Bluetooth® controller 1120 (FIG. 16), to communicate with the battery pack 5, and may also include a long-range transceiver, such as communication interface 1125 (FIG. 16), to communicate with a server (not shown).

The external device 805 may include, for example, a smart telephone, a tablet computer, a cellular phone, a laptop computer, a smart watch, and the like. The external device 805 may communicate with the battery pack 2, 5 to generate a graphical user interface (e.g., applications in FIGS. 14A-14M) to facilitate the adjustment of heat settings of the heated garments.

FIGS. 14A-14M illustrate an example heated gear application (i.e., "app") as it is shown on the external device 805 for a user to control heat settings of the heated garment. On a first screen 900 of the application (FIG. 14A), a user is able to select a heated garment profile 904 by selecting the "Inventory" tab 902. For example, the heated garment profile 904 may be for a heated jacket, such as heated jacket 10 (FIG. 2). The heated garment profile 904 may display the amount of charge (e.g., shown as a percentage, amount of time, etc.) left in the battery pack 2 coupled to the heated jacket 10, the heating level of a first heating zone (e.g., chest and back heating zone), and the heating level of a second heating zone (e.g., shoulder heating zone). On the first screen 900 of the application, the user may be able to add a new inventory item (i.e., a new heated garment) via the add new inventory item button 906.

On a second screen 910 of the application (FIG. 14B), a user is able to customize heat settings of a heated garment, such as heated jacket 10 (FIG. 2). A title portion 912 displays an identifier of the heated garment being controlled and that the heated garment is connected and in range of the external device 805. A charge amount 914 displays the amount of charge left in the battery pack 2, 5 coupled to the heated garment. A runtime 916 displays the amount of time that the heated garment can continue to be heated based on the amount of charge left in the battery pack 2, 5 and desired heating levels. The desired heating levels may be set using heating level adjustors 920, 924. For example, the heating level adjustors 920, 924 may be slide bars, a number input by a user, etc. Heating zones 918, 922 correspond to the heating level adjustors 920, 924 and display to the user what zones are active. An ambient temperature box 926 allows a user to set the ambient temperature that they are experiencing when wearing the heated garment. In some embodiments, the heating levels of the heating zones 918, 922 may adjust based on the ambient temperature.

In some embodiments, the user may use the application to create heated garment presets. The user may set presets for multiple heated garments. The presets allow a user to set various temperatures at various heating zones in the garments. In some embodiments, the user may adjust the preset for a runtime or a temperature. The presets allow a user to customize the heating settings within a heated garment. In some embodiments, the user may enable the heated garment preset via the application on the device 805 and/or at the user interface 700.

In some embodiments, such as when the user wearing the heated garment is actively working, unable to use their device 805 to control the heated garment, the user may enable the heated garment to automatically adapt to the ambient environment. For example, the user may enable automatic control of the heated garment via the application on the device 805 prior to beginning their work. As such, the controller 100 of the battery pack 2, 5 may automatically control the heated garments worn by the user. For example, the controller may control the heated garment according to the feedback method 600 discussed above (FIG. 10).

Figure 14D:
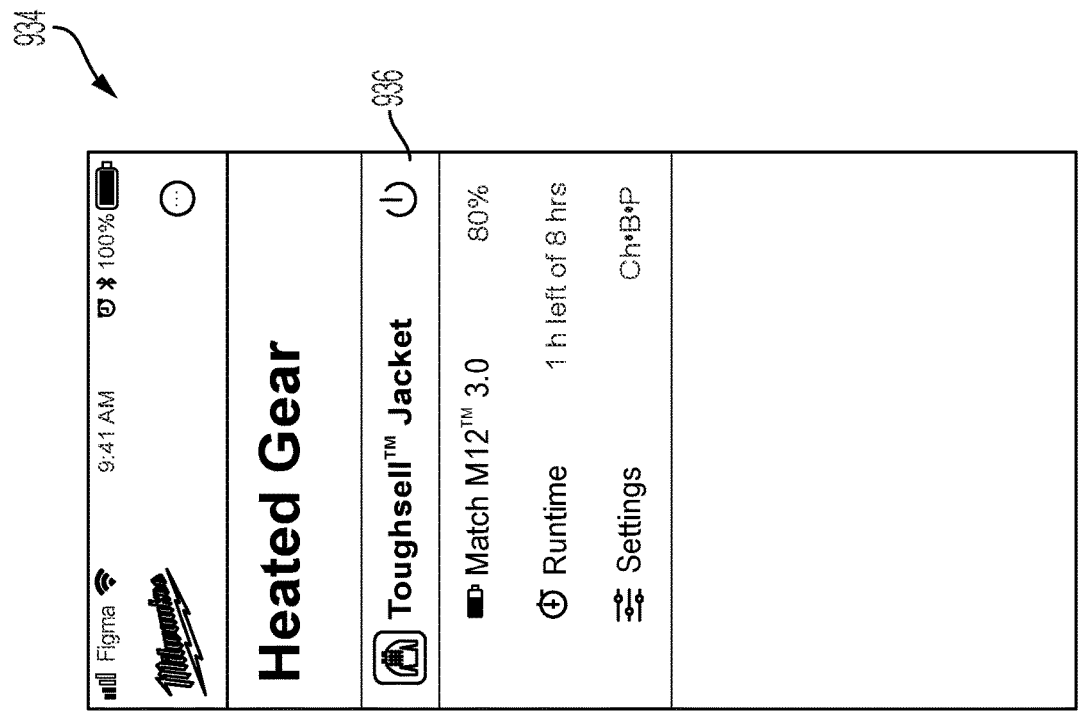
Figure 14C:
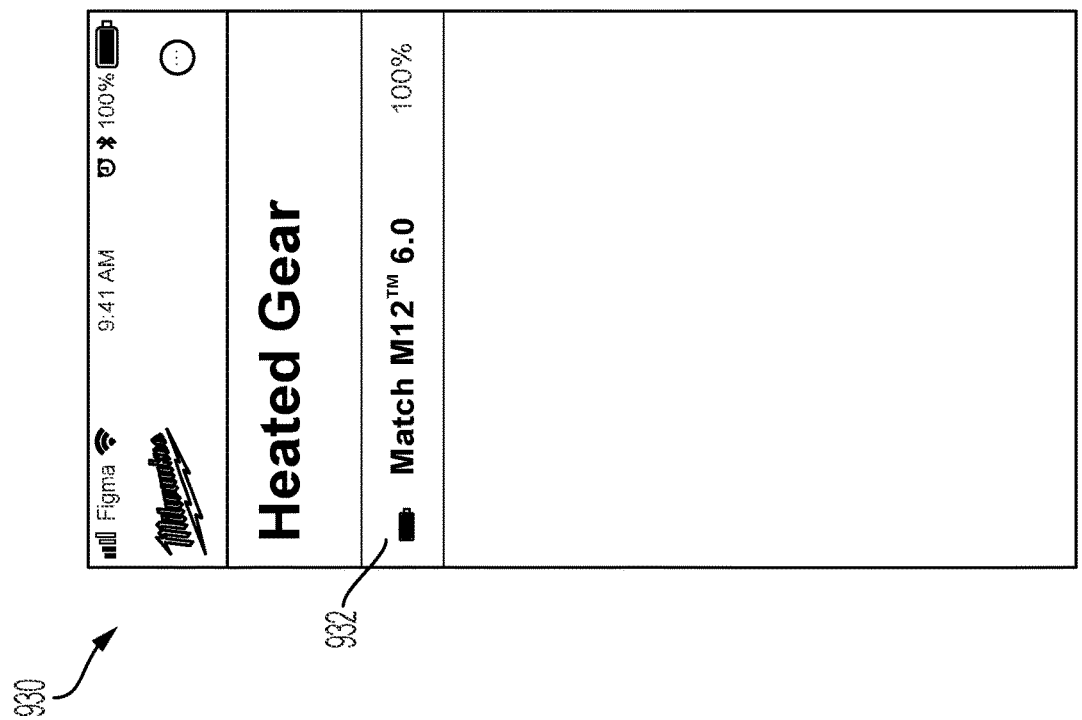

FIG. 14C illustrates a third screen 930 of the application. The third screen 930 includes a pairing module 932 that provides a visual indication that a battery pack, such as battery pack 5 (FIG. 1B), is paired with the external device 805. The pairing module 932 may include an icon representing the amount of charge remaining in the battery cells of the battery pack 5 as well as a percentage of charge left in the battery cells of the battery pack 5.

FIG. 14D illustrates a fourth screen 934 of the application. The fourth screen 934 includes a heated garment module 936 that provides a visual indication that a heated garment, such as heated jacket 10 (FIG. 2), is connected to the battery pack 5. The heated garment module 936 may include an icon representing the type of garment (e.g., jacket, glove, etc.) connected to the battery pack 5, an amount of charge remaining in the battery cells of the battery pack 5, a runtime of the heater array of the heated garment, and a setting status of the heater array. The heated garment module 936 may also include a power on button that sends a power on signal to the battery pack 5 to provide power to the heater array of the heated garment.

Figure 14F:
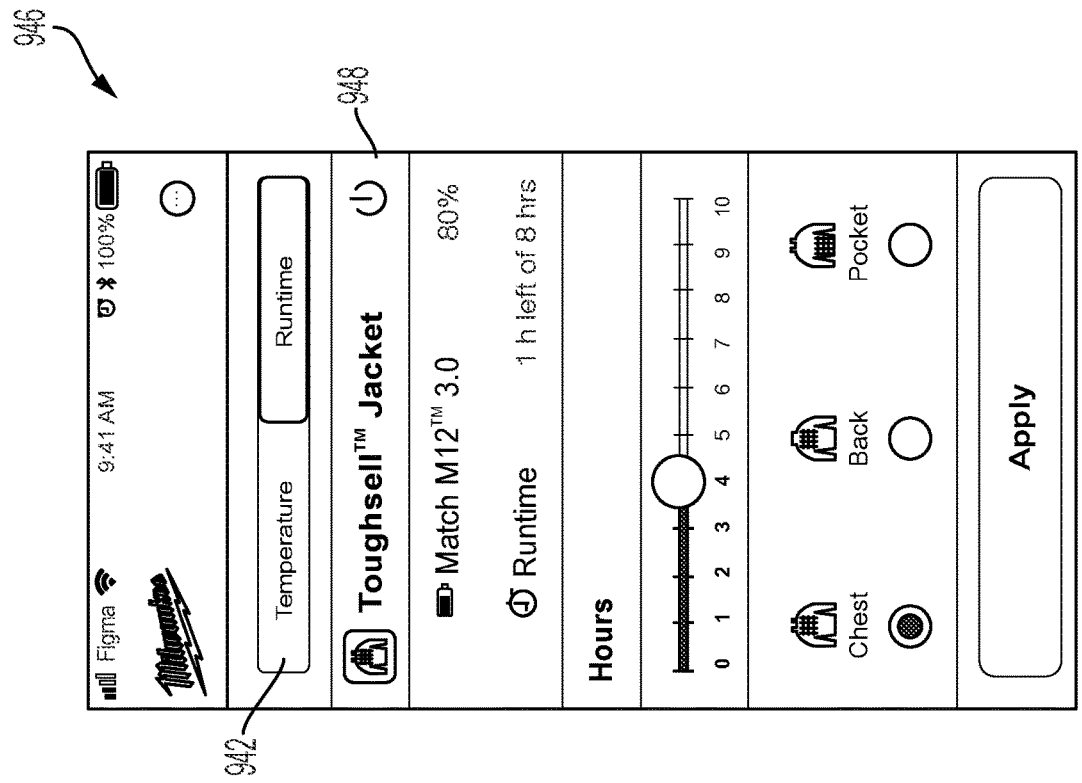
Figure 14E:
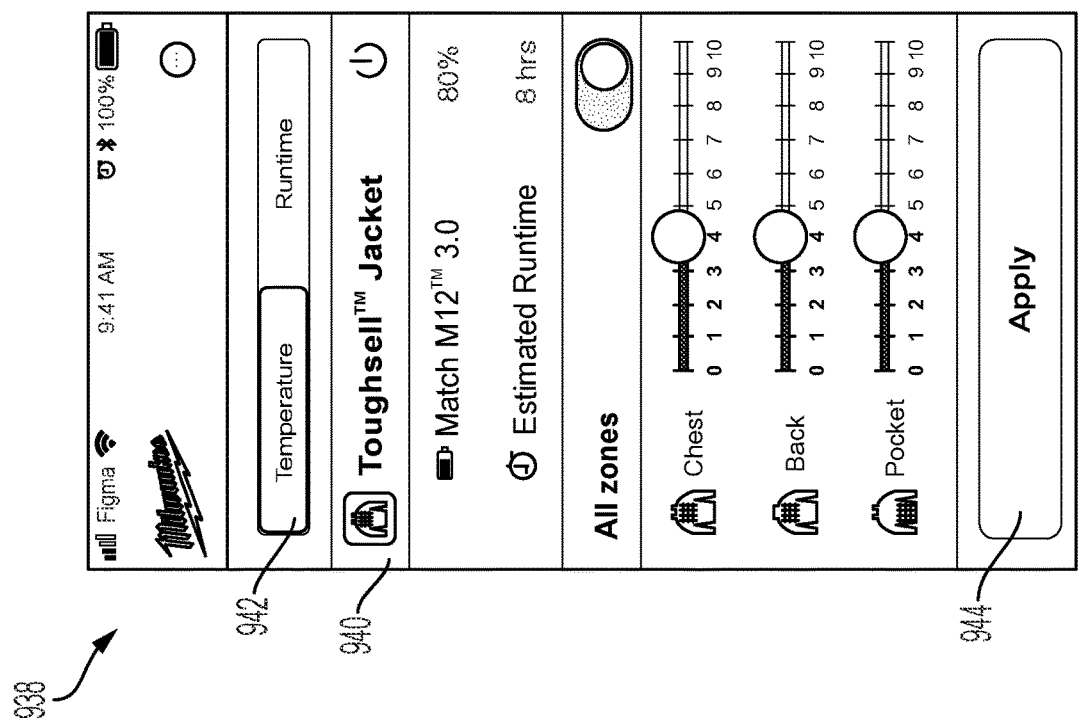

FIG. 14E illustrates a fifth screen 938 of the application. The fifth screen 938 includes a temperature module 940 that is provided on the user interface of the external device 805 when a user selects the heated garment module 936 of the fourth screen 934 (FIG. 14D). The fifth screen 938 also includes a toggle feature 942 for toggling the user interface between the fifth screen 938 of the application and a sixth screen 946 of the application (FIG. 14F) when interacted with by a user. The temperature module 940 provides a visual indication of the connected heated garment, such as heated jacket 10 (FIG. 2), an amount of charge remaining in the battery cells of the battery pack 5, a runtime of the heater array of the heated garment, and interactive heating zone setting elements. The interactive heating zone setting elements may be slide bars that specify the heater level of a particular heating zone (e.g., chest, back, pocket) when the user interacts with the slide bars via the user interface of the external device 805. The fifth screen 938 additionally includes an "Apply" button 944 that applies the requested heater level settings to the heating zones when interacted with by a user via the user interface of the external device 805.

FIG. 14F illustrates the sixth screen 946 of the application. The sixth screen 946 includes a runtime module 948 that is provided on the user interface of the external device 805 when a user toggles the toggle feature 942 after selecting the heated garment module 936 of the fourth screen 934 (FIG. 14D) and landing on the fifth screen 938. In some embodiments, when a user selects the heated garment module 936 of the fourth screen 934 (FIG. 14D), the application provides the sixth screen 946 to the user interface of the external device 805. The runtime module 948 provides a visual indication of the connected heated garment, such as heated jacket 10 (FIG. 2), an amount of charge remaining in the battery cells of the battery pack 5, a runtime of the heater array of the heated garment, and interactive runtime setting elements for each heating zone. In some embodiments, the runtime setting element may be a slide bar that is provided with one hour increments. The user may interact with the slide bars via the user interface of the external device 805 to set the runtime of a selected heating zone. The heating zone may be selected by a user selecting the desired heating zone via the user interface.

FIG. 14G illustrates a seventh screen 950. The seventh screen 950 includes a notification 952 on a lock screen of the user interface of the external device 805. The notification may indicate a low battery level (i.e., an amount of charge left in the battery cells of the battery pack 5 is less than a threshold amount) and/or temperature information. When selected via a tap on the user interface of the external device, the application may open to an eighth screen 954 (FIG. 14H). The eighth screen 954 may be the last open page of the application. For example, the eighth screen 954 may be the same as the fifth screen 938 or the sixth screen 946. The user may select a notifications button 956 (e.g., a circle with three dots in it) via the user interface of the external device 805 to be brought to a ninth screen 958 (FIG. 14I).

FIG. 14I illustrates the ninth screen 958 of the application. The ninth screen 958 is a notifications screen with a customization module 960 including customizable elements pertaining to notifications from the application. The elements include an allow notification button 962, a threshold amount notification button 964, and notification frequency buttons 966. The buttons 962, 964, 966 are selectable when a user interacts with the user interface of the external device 805.

Figure 14K:
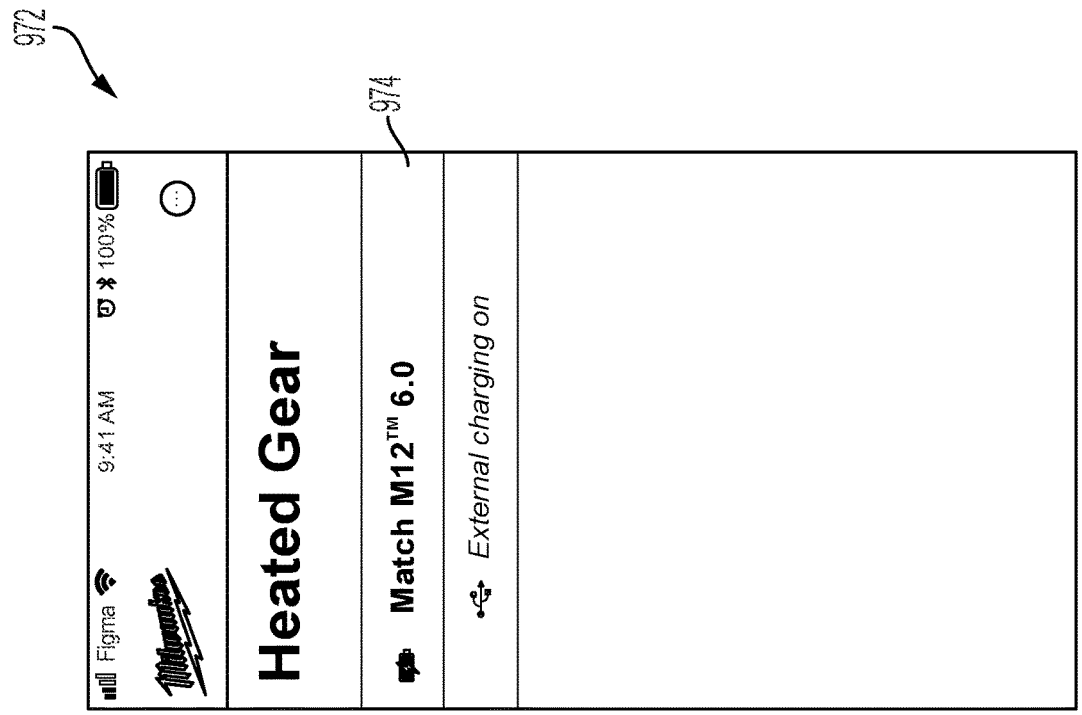
Figure 14J:
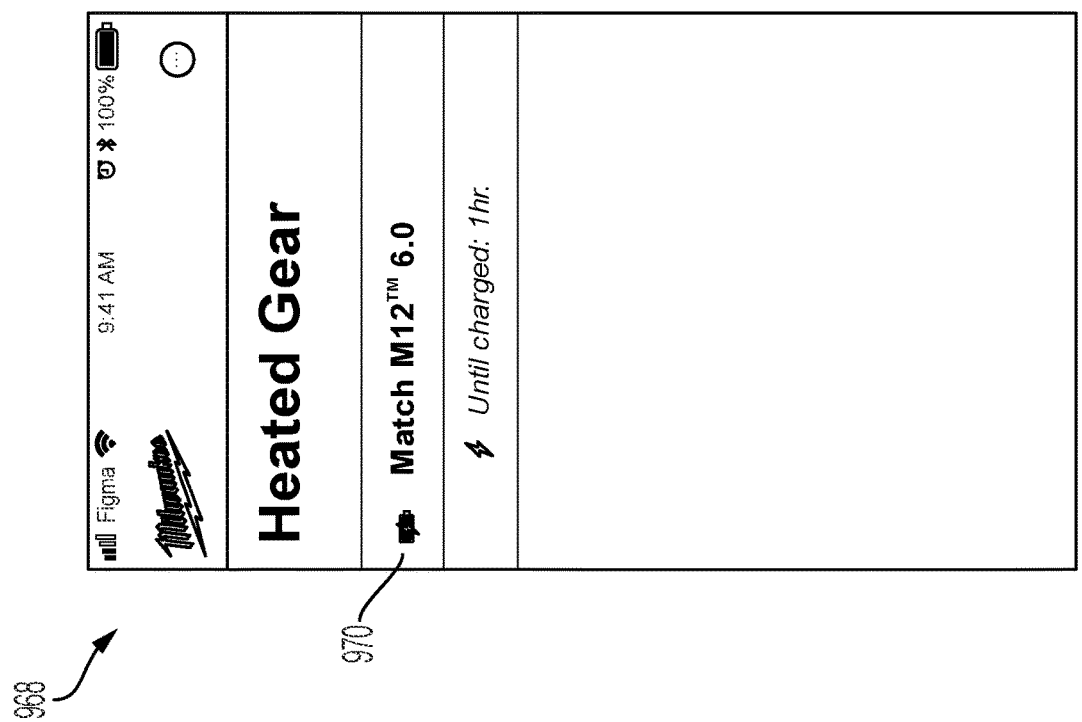

FIG. 14J illustrates a tenth screen 968 of the application. The tenth screen 968 includes a charging module 970 that provides a visual indication that a battery pack, such as battery pack 5 (FIG. 1B), that is paired with the external device 805 is being charged. The charging module 970 may include an icon representing the charging status of the battery cells of the battery pack 5 as well as a time remaining until full charge of the battery cells of the battery pack 5.

FIG. 14K illustrates an eleventh screen 972 of the application. The eleventh screen 972 includes a charge-provided module 974 that provides a visual indication that a device is being charged by a battery pack, such as battery pack 5 (FIG. 1B), that is paired with the external device 805. The charge-provided module 974 may include an icon representing that the device is being charged by the battery pack 5.

Figure 14M:
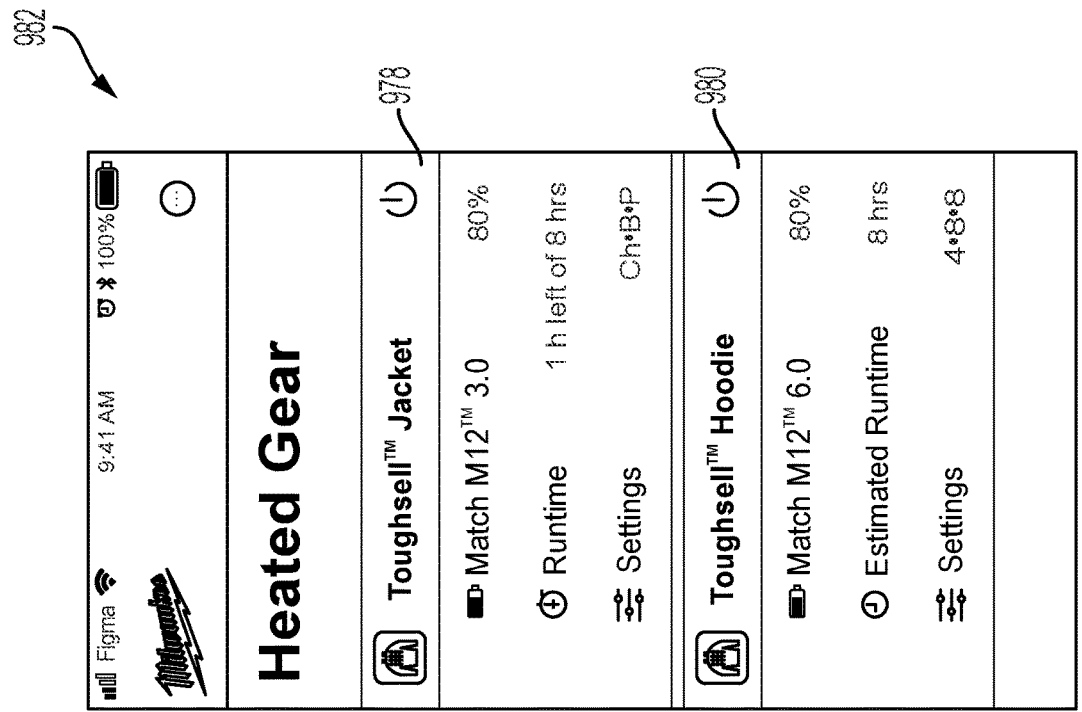
Figure 14L:
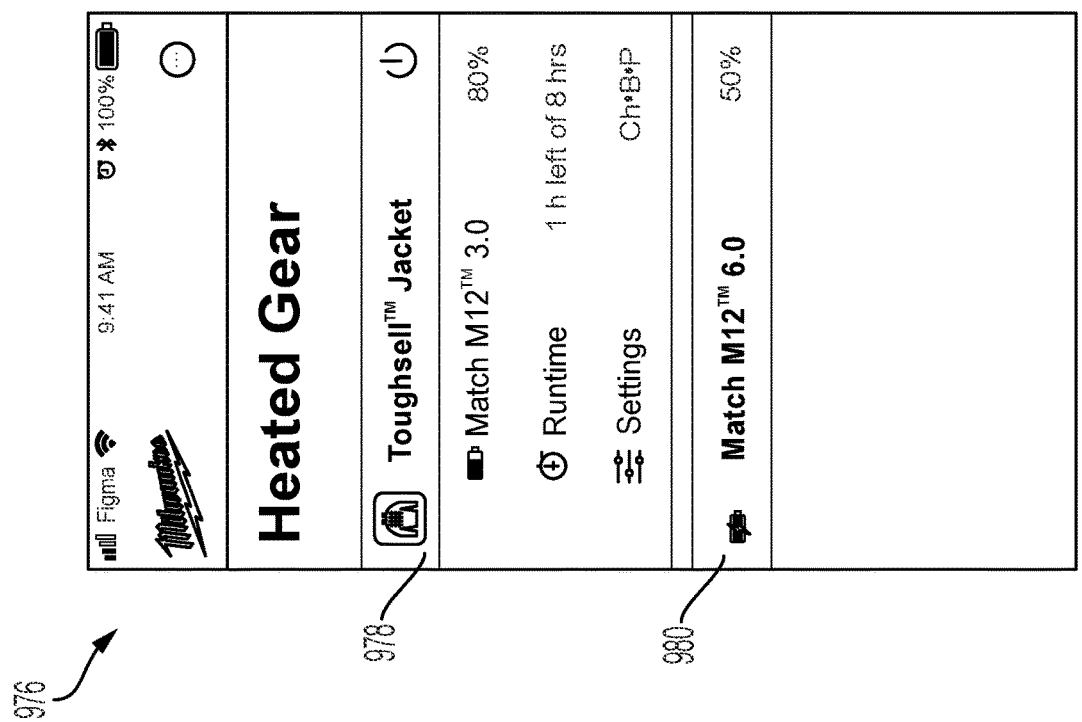

FIG. 14L illustrates a twelfth screen 976 of the application. The twelfth screen 976 includes a first battery pack module 978 and a second battery pack module 980 that provide a visual indication that a first battery pack, such as battery pack 2 (FIG. 1A), and a second battery pack, such as battery pack 5 (FIG. 1B), are both paired with the external device 805 at the same time. When selected via the user interface of the external device 805, the first battery pack module 978 may expand to display an icon representing the type of garment (e.g., jacket, glove, etc.) connected to the battery pack 2, an amount of charge remaining in the battery cells of the battery pack 2, a runtime of the heater array of the heated garment, and a setting status of the heater array. In some embodiments, two battery packs may be paired with the external device 805 and either none, one, or both may be connected to a heated garment.

FIG. 14M illustrates a thirteenth screen 982 of the application. The thirteenth screen 982 includes the first battery pack module 978 and the second battery pack module 980 that provide a visual indication that a first battery pack, such as battery pack 2 (FIG. 1A), and a second battery pack, such as battery pack 5 (FIG. 1B), are both paired with the external device 805 at the same time. When selected via the user interface of the external device 805, the first battery pack module 978 may expand to display an icon representing the type of garment (e.g., jacket, glove, etc.) connected to the battery pack 2, an amount of charge remaining in the battery cells of the battery pack 2, a runtime of the heater array of the heated garment, and a setting status of the heater array. When a heated garment is connected to the second battery pack 5 and the second battery pack module 980 is selected via the user interface of the external device 805, the second battery pack module 980 may expand to display an icon representing the type of garment (e.g., jacket, glove, etc.) connected to the battery pack 5, an amount of charge remaining in the battery cells of the battery pack 5, a runtime of the heater array of the heated garment, and a setting status of the heater array. The first battery pack module 978 and the second battery pack module 980 may also include power on buttons that send a power on signal to the respective battery packs 2, 5 provide power to the heater array of the respective, connected heated garments.

FIG. 15 is a journey map 1000 showing an example journey of a heated garment. When the garment is first purchased and used, a user may connect a battery pack, such as battery pack 2 (FIG. 1), with an external device, such as external device 805 (FIG. 12), with ease. The user may charge the battery pack 2. The user may use the external device 805 to communicate heat settings clearly to a battery pack controller, such as controller 100 (FIG. 5). The user may customize heating levels in heating zones, customize heating levels to user comfort, adapt to lifestyle activities, and create temperature personas. The user may add or remove additional heated garments and copy settings from one heated garment to another. The user may view usage statistics of the battery pack 2 and the heated garment on the device 805. The battery pack 2 may learn patterns and behaviors of the user and record those patterns and behaviors.

As a user begins using the heated garment, the controller 100 may prepare for the day's weather. The user may control the battery pack 2 to turn heat ON or OFF. The controller 100 controls a heater array, such as heater array 26 (FIG. 2), of the heated garment to produce the right amount of heat when needed, not get too hot or too cold, get the longest runtime possible, heat the heated garment for the full workday, and run for a set period of time.

FIG. 16 is a block diagram of an external device 1100. The external device 805 may include one or more components shown in external device 1100.

In some embodiments, the external device 1100 may include one or more processors 1105 and a memory 1110. A memory bus may be used for communication between the processor 1105 and the memory 1110.

The processor 1105 may be, for example, an electronic processor, a microprocessor (μP), a microcontroller (μC), a digital signal processor (DSP), or a combination thereof. The processor 1105 may include one more levels of caching, such as a level cache memory, a processor core, and registers. The processor core may include an arithmetic logic unit (ALU), a floating point unit (FPU), a digital signal processing core (DSP Core), or any combination thereof. A memory controller may also be used with the processor 1105, or in some implementations, the memory controller may be an internal part of the processor 1105. In some embodiments, the memory 1110 may include the heated gear application discussed with respect to FIGS. 13A and 13B.

Depending on the desired configuration, the memory 1110 include, for example, volatile memory (such as RAM), non-volatile memory (such as ROM, flash memory, etc.), or a combination thereof.

A user interface 1115 may include a hardware screen that may be communicatively coupled to the external device 1100. The user interface 1115 may include a touch sensitive device that detects gestures such as a touch action. The user interface 1115 may also provide feedback in response to detected gestures (or other form of input) from the heated gear application.

The external device 1100 includes a Bluetooth® controller 1120, or wireless controller. The Bluetooth® controller 1120 enables the external device 1100 to communicate with other Bluetooth® enabled devices, such as the controller 100 of the battery pack 2, when the external device 1100 is in range of the other devices.

The external device 1100 includes a communication interface 1125. The external device 1100 may communicate with other devices over a network (not shown) via the communication interface 1125. For example, the communication interface 1127 may include a transceiver.

The external device 1100 may have additional features or functionality, and additional interfaces to facilitate communications between the external device 1100 and other devices (e.g., battery pack 2) and interfaces. For example, a bus/interface controller may be used to facilitate communications between the memory 1110 and the processor 1105, and one or more data storage devices via a storage interface bus. The data storage devices may be one or more removable storage devices, one or more non-removable storage devices or a combination thereof.

Figure 17:
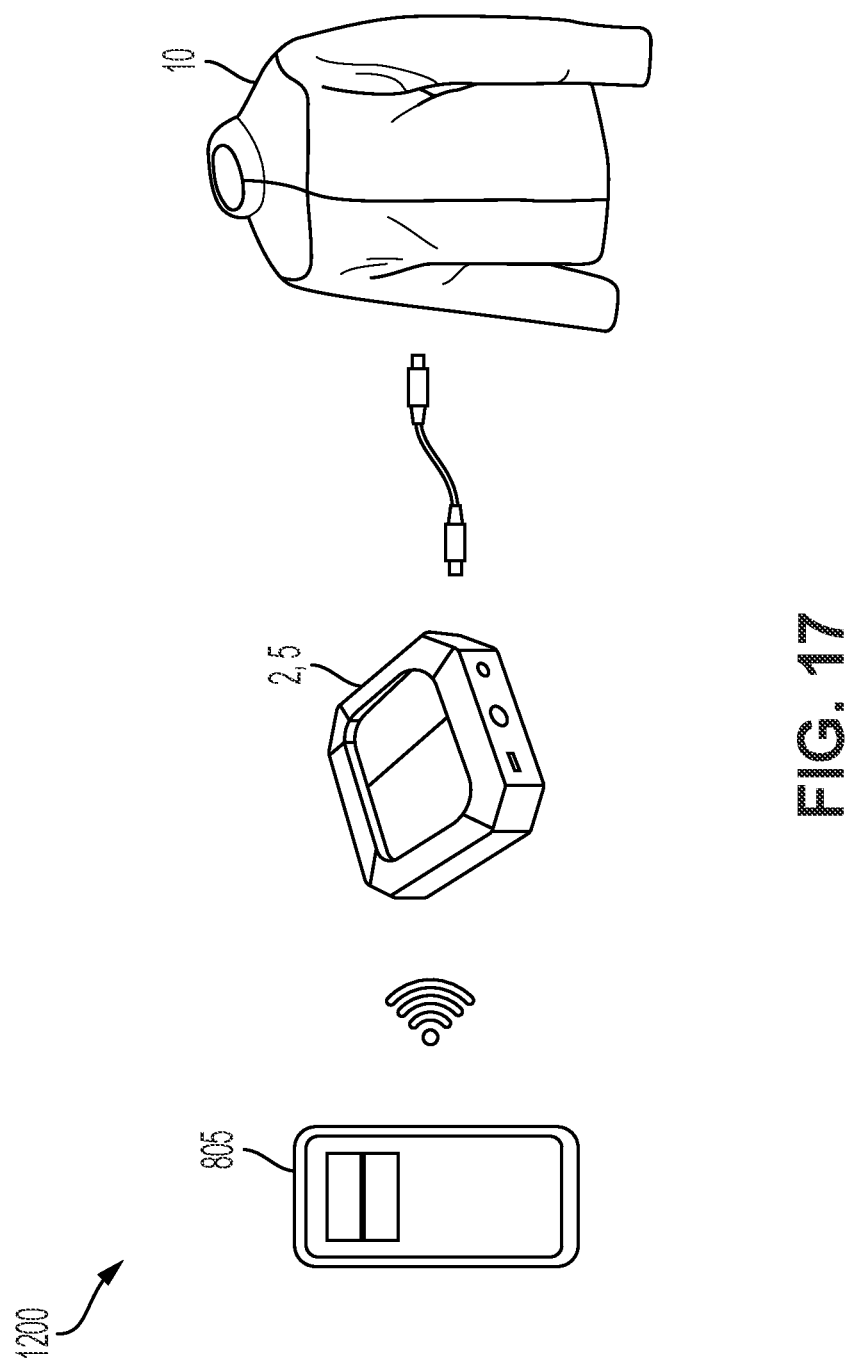
FIG. 17 illustrates a communication network for the battery packs of FIGS. 1A & 1B and an external device when the battery pack is connected to the heated garment of FIG. 2, according to some embodiments.

FIG. 17 illustrates a communication network 1200 for the battery packs 2, 5 (FIGS. 1A & 1B, respectively) and the external device 805, when the battery pack 2, 5 is connected to a heated garment, such as the heated jacket 10 (FIG. 2). When connected to the heated jacket 10 via a connector, such as the first dual connector 400 (FIG. 8A) or the second dual connector 430 (FIG. 8C), the battery pack 2, 5 provides a signal (e.g., over Bluetooth®, cellular, etc.) to the paired external device 805. As shown in FIGS. 14A-14M, the application on the user interface of the external device 805 displays a customizable heated garment name (e.g., "Heated Jacket"), a power on/off button, heating zone settings, estimated runtime, and heating zone adjustment settings for the heated jacket 10 connected to the battery pack 2, 5. In some embodiments, the heating zone settings may be saved on the heated jacket. For example, the heating zone settings may be saved in the memory 235 of the hated jacket controller 200.

Figure 18:
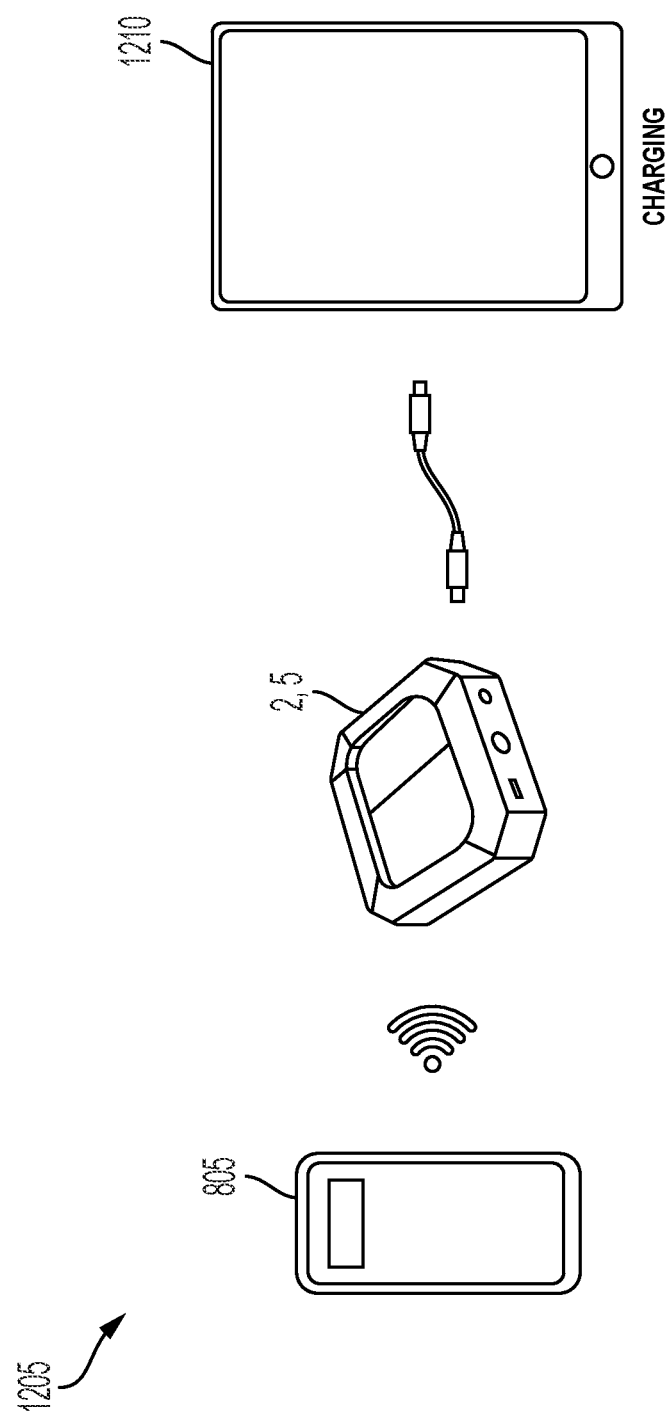
FIG. 18 illustrates a communication network for the battery packs of FIGS. 1A & 1B and an external device when the battery pack is used as a power supply, according to some embodiments.

FIG. 18 illustrates a communication network 1205 for the battery packs 2, 5 (FIGS. 1A & 1B, respectively) and the external device 805, when the battery pack 2, 5 is used as a power supply. When connected to a device 1210 (e.g., a mobile phone, tablet, etc.) via a connector, such as a USB-C connector cable, the battery pack 2, 5 provides a signal (e.g., over Bluetooth®, cellular, etc.) to the paired external device 805. As shown in FIG. 14K, the application on the user interface of the external device displays a charge-provided module 974 that provides a visual indication that the device 1210 is being charged by the battery pack 2, 5. The charge-provided module 974 may display a customizable battery pack name, an amount of charge remaining in the battery cells of the battery pack 2, and an icon representing the charging status of the battery cells of the battery pack 2, 5.

Figure 19:
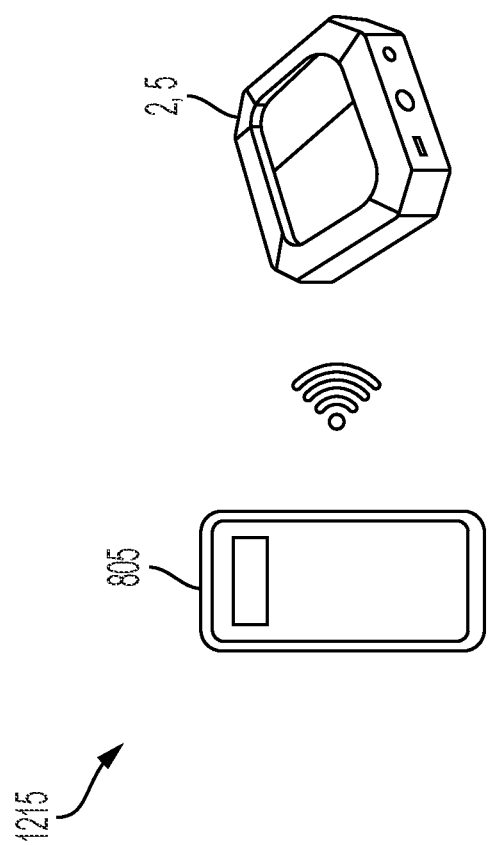
FIG. 19 illustrates a communication network for the battery packs of FIGS. 1A & 1B and an external device when the battery pack is paired with the external device, according to some embodiments.

FIG. 19 illustrates a communication network 1215 for the battery packs 2, 5 (FIGS. 1A & 1B, respectively) and the external device 805, when the battery pack 2, 5 is paired with the external device 805. When paired with the battery pack 2, 5, the application on the user interface of the external device 805 may display the charging module 970 (FIG. 14J) that provides a visual indication that the battery pack 2,5 is being charged. The charging module 970 may include a customizable battery pack name, an icon representing the charging status of the battery cells of the battery pack 2, 5, an amount of charge remaining in the battery cells of the battery pack 2, 5, as well as a time remaining until full charge of the battery cells of the battery pack 2, 5.

Figure 20:
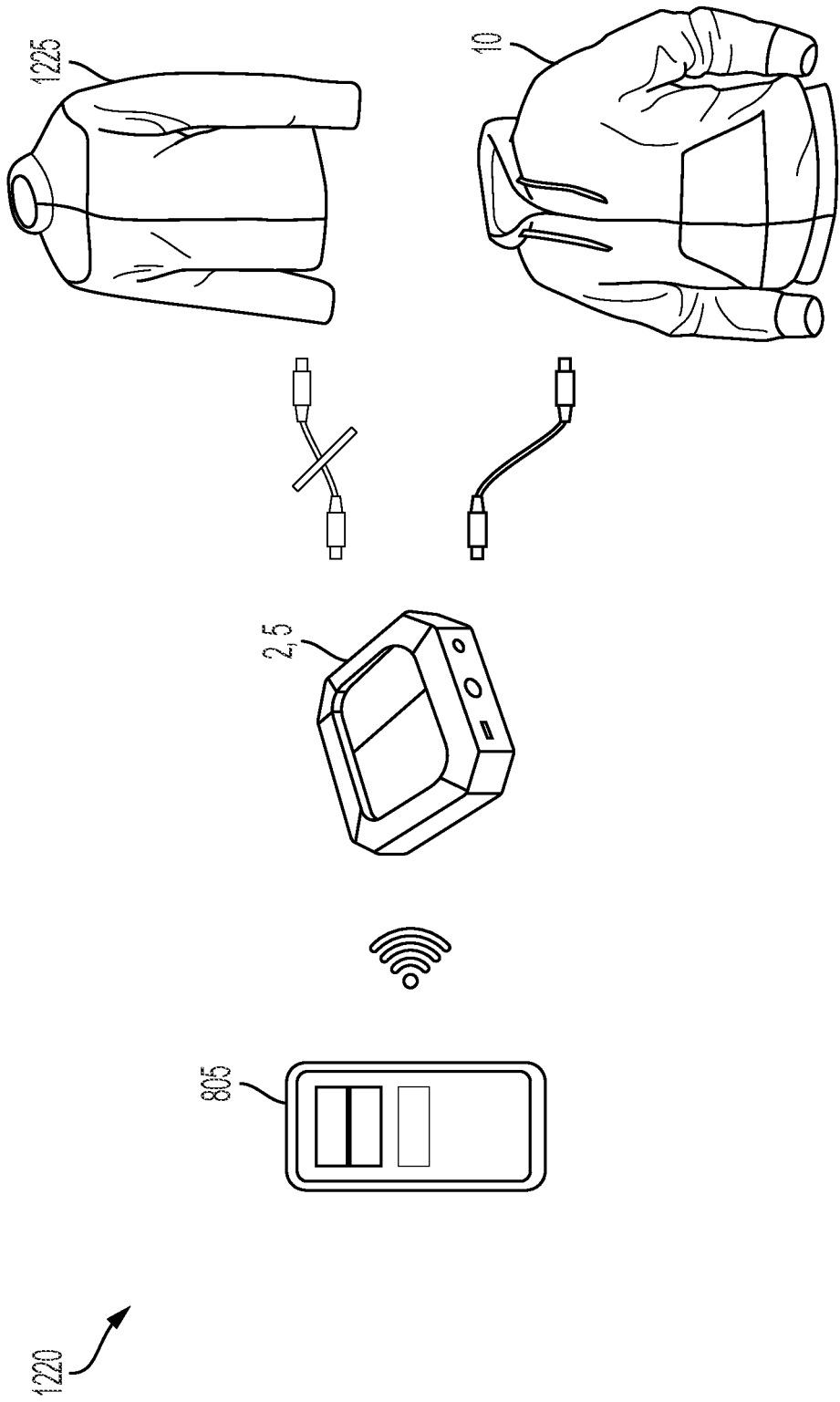
FIG. 20 illustrates a communication network for the battery packs of FIGS. 1A & 1B and an external device when the battery pack has been paired with multiple heated garments, such as the heated garment of FIG. 2, according to some embodiments.

FIG. 20 illustrates a communication network 1220 for the battery packs 2, 5 (FIGS. 1A & 1B, respectively) and the external device 805, when the battery pack 2, 5 is connected to multiple heated garments, such as the heated jacket 10 (FIG. 2) and a second heated jacket 1225. In some embodiments, the second heated jacket 1225 is substantially similar to heated jacket 10. In some embodiments, the external device 805 has previously paired with the heated jacket 10 and the second heated jacket 1225 when they were initially connected to the battery pack 2, 5 via a connector, such as the first dual connector 400 (FIG. 8A) or the second dual connector 430 (FIG. 8C). The application on the user interface of the external device 805 may display a module corresponding the heated jacket 10 and a separate module corresponding to the second heated jacket 1225. The application may indicate that the heated jacket 10 is connected to the battery pack 2, 5 by presenting the module corresponding to heated jacket 10 first or any other way to indicate that the heated jacket 10 is connected to the battery pack 2, 5. A user may interact with the module corresponding to the second heated jacket 1225 via the user interface of the external device 805 to change settings (e.g., temperature or runtime). The updated settings will be communicated to the second heated jacket 1225 when the second heated jacket 1225 is next connected to the battery pack 2, 5.

Figure 21:
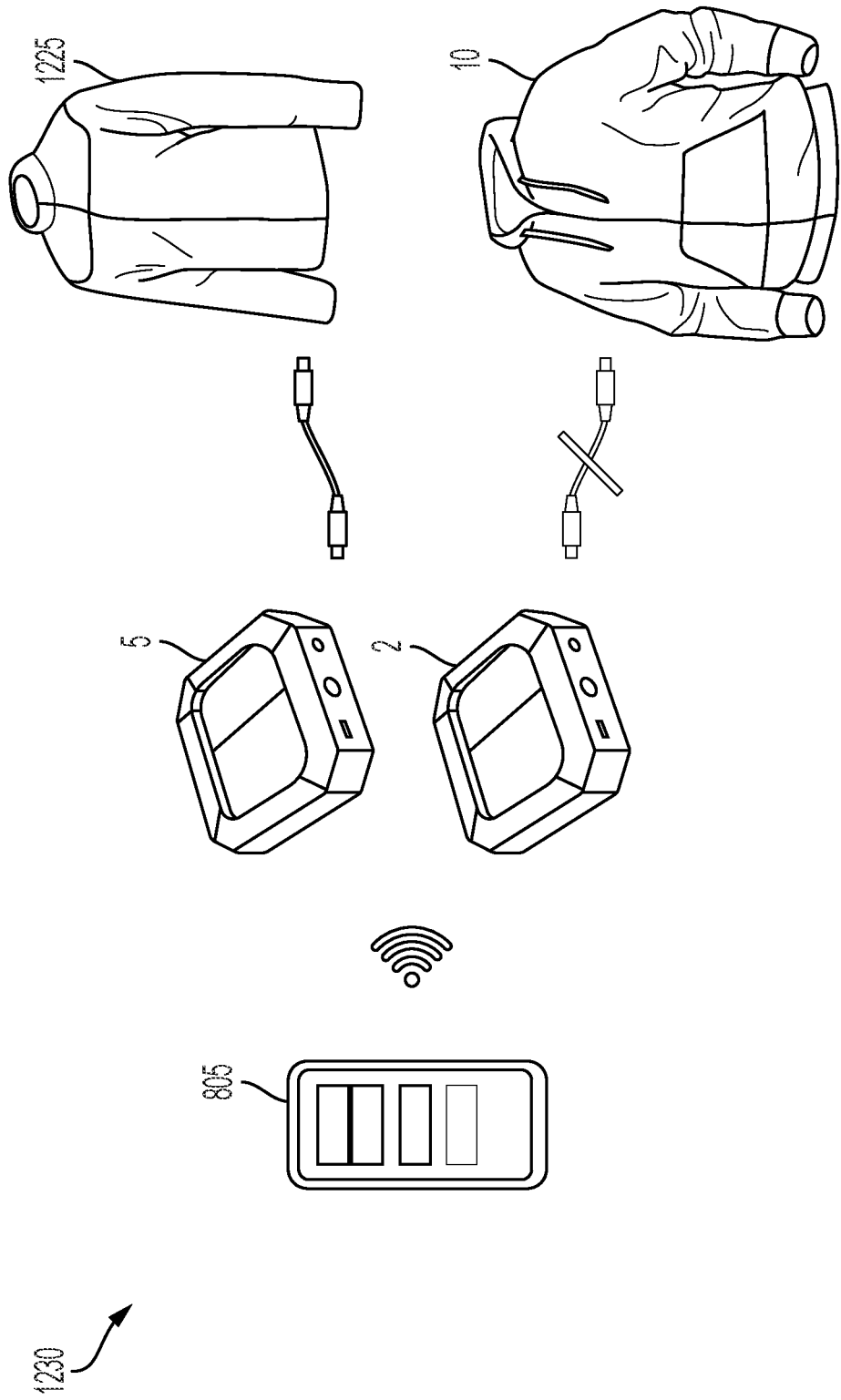
FIG. 21 illustrates a communication network for the battery packs of FIGS. 1A & 1B and an external device when the external device is connected to two battery packs, according to some embodiments.

FIG. 21 illustrates a communication network 1230 for the battery packs 2, 5 (FIGS. 1A & 1B, respectively) and the external device 805, when the external device 805 is connected to a first battery pack, such as battery pack 2 (FIG. 1A), and a second battery pack, such as battery pack 5 (FIG. 1B). The application on the user interface of the external device 805 may display the first battery pack module 978 (FIG. 14L) and the second battery pack module 980 that provide a visual indication that the first battery pack 2 and the second battery pack are both paired with the external device 805 at the same time. The first battery pack module 978 may display an icon representing the type of garment, such as the heated jacket 10, that has previously been connected to the battery pack 2. The second battery pack module 980 may display an icon representing the type of garment, such as the second heated jacket 1225, connected to the second battery pack 5, an amount of charge remaining in the battery cells of the battery pack 5, a runtime of the heater array of the heated garment, and a setting status of the heater array. A user may interact with the first battery pack module 978 via the user interface of the external device 805 to change settings (e.g., temperature or runtime). The updated settings will be communicated to the heated jacket 10 when the heated jacket 10 is next connected to the battery pack 2.

Figure 22:
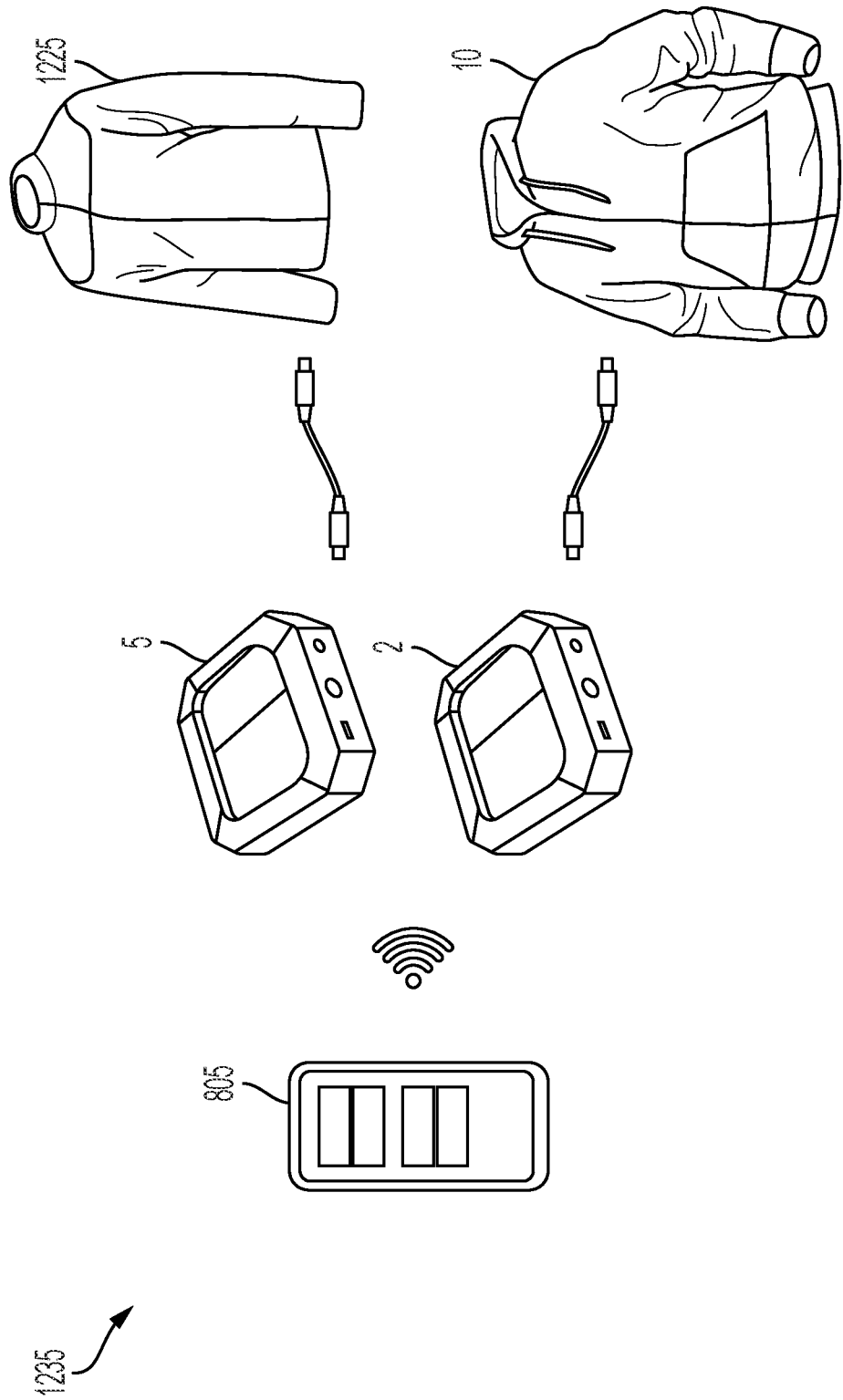
FIG. 22 illustrates a communication network for the battery packs of FIGS. 1A & 1B and an external device when the external device is connected to two battery packs that are each connected to a heated garment, such as the heated garment of FIG. 2, according to some embodiments.

FIG. 22 illustrates a communication network 1235 for the battery packs 2, 5 (FIGS. 1A & 1B, respectively) and the external device 805, when the external device 805 is connected to a first battery pack, such as battery pack 2 (FIG. 1A), and a second battery pack, such as battery pack 5 (FIG. 1B) when both battery packs 2, 5 are connected to heated garments, such as heated jacket 10 and second heated jacket 1225, respectively. The application on the user interface of the external device 805 may display the first battery pack module 978 (FIG. 14L) and the second battery pack module 980 that provide a visual indication that the first battery pack 2 and the second battery pack are both paired with the external device 805 at the same time. The first battery pack module 978 may display an icon representing the type of garment, such as the heated jacket 10, connected to the first battery pack 2, a power on button, an amount of charge remaining in the battery cells of the battery pack 2, a runtime of the heater array of the heated garment, and a setting status of the heater array. The second battery pack module 980 may display an icon representing the type of garment, such as the second heated jacket 1225, connected to the second battery pack 5, a power on button, an amount of charge remaining in the battery cells of the battery pack 5, a runtime of the heater array of the heated garment, and a setting status of the heater array. A user may interact with the first battery pack module 978 via the user interface of the external device 805 to change settings (e.g., temperature or runtime) of the heated jacket 10 and the user may interact with the second battery pack module 980 to change settings (e.g., temperature or runtime) of the second heated jacket 1225.

Figure 23:
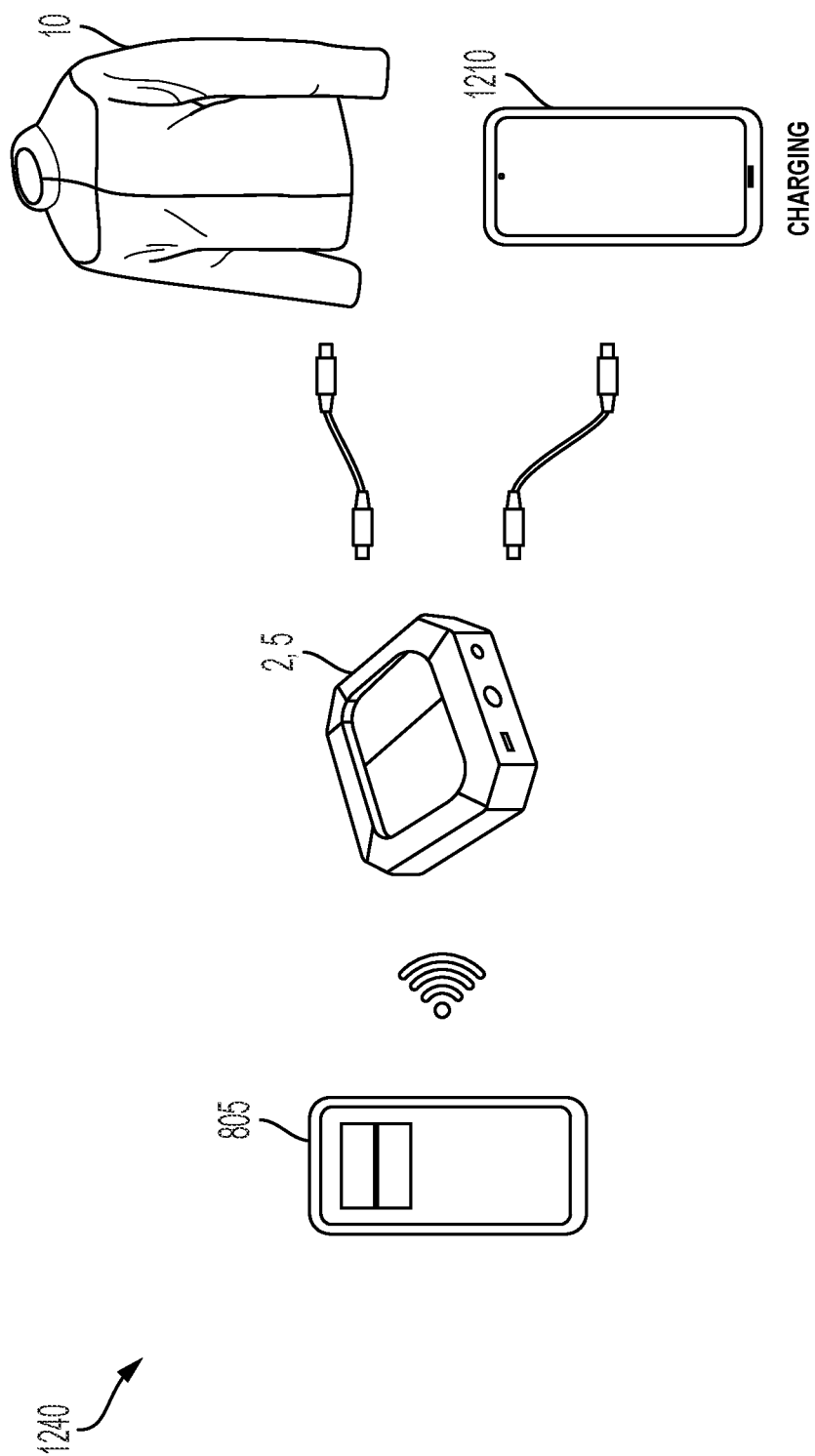
FIG. 23 illustrates a communication network for the battery packs of FIGS. 1A & 1B and an external device when the battery pack is connected to the heated garment of FIG. 2 and used as a power supply, according to some embodiments.

FIG. 23 illustrates a communication network 1240 for the battery packs 2, 5 (FIGS. 1A & 1B, respectively) and the external device 805, when the battery pack 2, 5 is connected to a heated garment, such as heated jacket 10 (FIG. 2), and being used as a power supply. When connected to the heated jacket 10 via a connector, such as the first dual connector 400 (FIG. 8A) or the second dual connector 430 (FIG. 8C), the battery pack 2, 5 provides a signal (e.g., over Bluetooth®, cellular, etc.) to the paired external device 805. The application on the user interface of the external device 805 displays a customizable heated garment name (e.g., "Heated Jacket"), a power on/off button, heating zone settings, estimated runtime, and heating zone adjustment settings for the heated jacket 10 connected to the battery pack 2, 5. Simultaneous to providing power and control to the heated jacket, the battery pack 2, 5 may act as a power supply to providing charging power to a device, such as device 1210. When connected to the device 1210 (e.g., a mobile phone, tablet, etc.) via a connector, such as a USB-C connector cable, the battery pack 2, 5 provides a signal (e.g., over Bluetooth®, cellular, etc.) to the paired external device 805. The application on the user interface of the external device displays a charge-provided module 974 that provides a visual indication that the device 1210 is being charged by the battery pack 2, 5. The charge-provided module 974 may display a customizable battery pack name, an amount of charge remaining in the battery cells of the battery pack 2, and an icon representing the charging status of the battery cells of the battery pack 2, 5.

Figure 24:
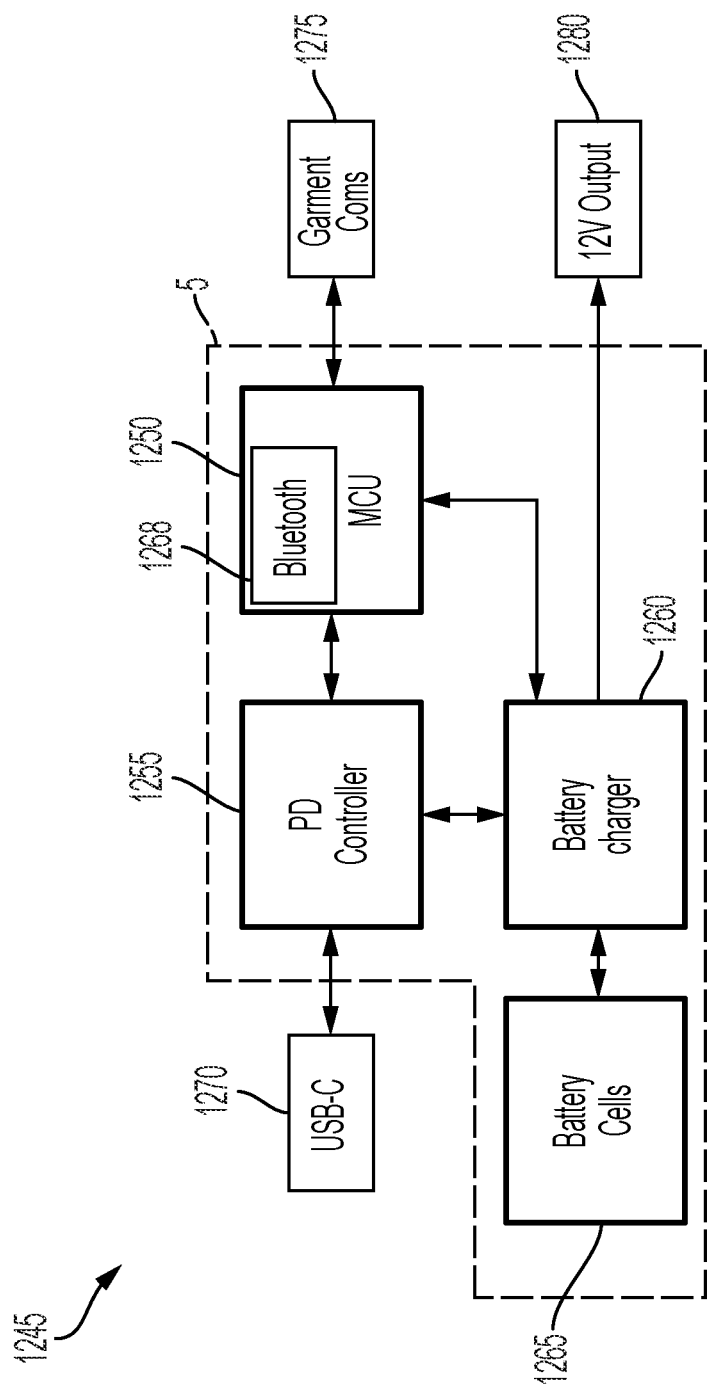
FIG. 24 illustrates a block diagram of the battery pack of FIG. 1B, according to some embodiments.

FIG. 24 illustrates a block diagram 1245 of a battery pack, battery pack 5 (FIG. 1B). The battery pack 5 includes a control unit 1250, a proportional-derivative (PD) controller 1255, a battery charger 1260, and battery cells 1265. The control unit 1250 includes a Bluetooth® controller 1268. The control unit 1250 outputs control to a communication unit 1275 of a heated garment, such as the heated jacket 10 (FIG. 2). The battery charger 1260 outputs a charging current to a charging output 1280. In some embodiments, the battery charger 1260 provides a 12 V charging output. The PD controller 1255 provides a charging current output to a USB-C interface 1270.

Figure 25:
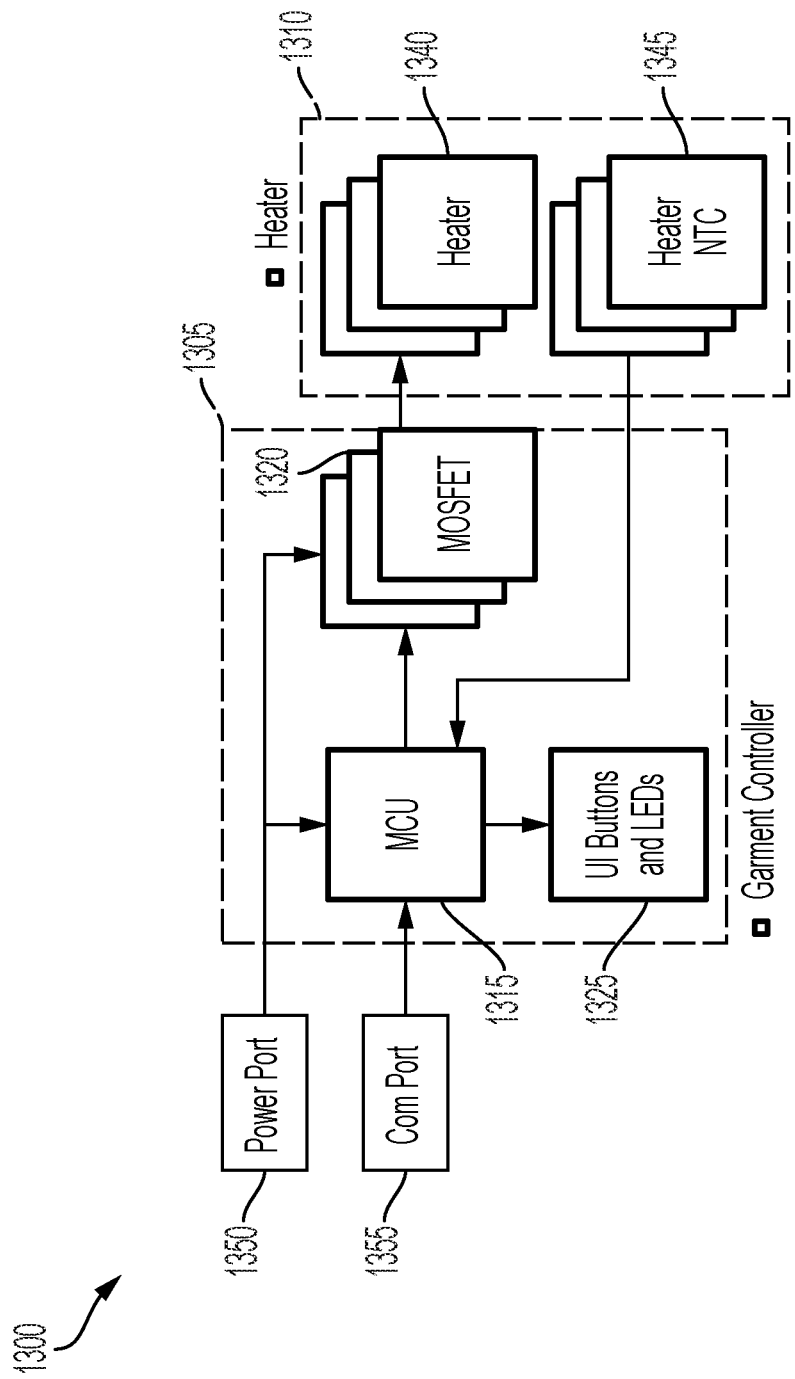
FIG. 25 illustrates a block diagram of the heated garment of FIG. 2, according to some embodiments.

FIG. 25 illustrates a block diagram 1300 of a heated garment, such as heated jacket 10 (FIG. 2). The heated jacket 10 includes a garment controller 1305, a heater 1310, a power port 1350, and a communication port 1355. The garment controller 1305 includes a control unit 1315, a MOSFET 1320, a user interface (UI) buttons and LED 1325. The heater 1310 includes a heater 1340 and a heater thermistor 1345. The MOSFET 1320 receives power from the power port 1350 and controls the flow of current to the heater 1340 based on an input from the control unit 1315. The control unit 1315 receives power from the power port 1350 and data from the communication port 1355. The control unit 1315 also receives temperature data from the heater thermistor 1345. The UI buttons and LED 1325 receive control signals from the control unit 1315.

Figure 26:
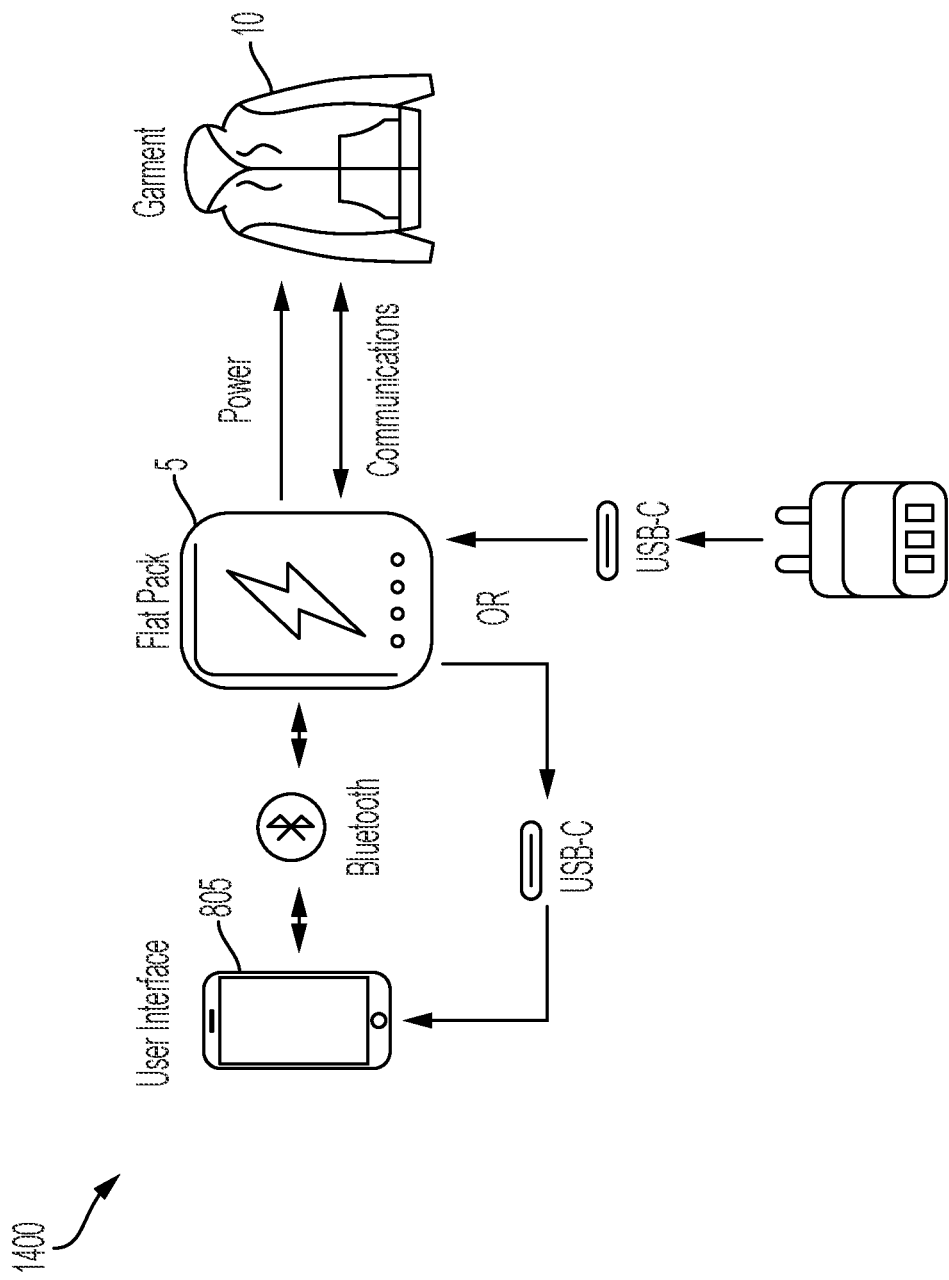
FIG. 26 illustrates a communication network for the battery packs of FIGS. 1A & 1B and an external device when the external device is connected to the heated garment of FIG. 2 and receiving charging power, according to some embodiments.

FIG. 26 illustrates a communication network 1400 for the battery packs 2, 5 (FIGS. 1A & 1B, respectively) and the external device 805, when the battery pack 2, 5 is connected to a heated garment, such as heated jacket 10 (FIG. 2), and is either receiving charging power or being used as a power supply. The battery pack 2, 5 may wirelessly communicate with the external device 805 while acting as a power supply and supplying power to the external device 805 via a wired connection connected to a USB-C port on the battery pack 2, 5. Alternatively, the battery pack 2, 5 may wirelessly communication with the external device 805 while receiving charging power from an external source via the USB-C port on the battery pack 2, 5. For example, the battery pack 2, 5 may receive charging power from an alternative current (AC) power source, such as conventional wall outlet. Simultaneously to either providing power or receiving power, the battery pack 2, 5 may provide power and communication, as well as receiving communication, to and from the heated jacket 10.

Thus, embodiments described herein provide, among other things, a battery pack with a control unit for controlling a heated garment and wirelessly communicating with an external device. Various features and advantages are set forth in the following claims.

What is claimed is:

1. A power source for a heated garment, comprising:
a housing;
one or more battery cells located within the housing;
a user interface positioned on the housing;
an electrical interface positioned on the housing for connecting to the heated garment; and
a controller located within the housing and including an electronic processor and a memory, the controller coupled to the battery cells, the user interface, and the electrical interface, the controller being configured to:
communicate with the heated garment and a device,
communicate with and provide power to the heated garment via a wired connection,
wirelessly communicate with the device,
receive a temperature setpoint from the device, wherein the temperature setpoint is set via a user interface of the device and wirelessly communicated to the controller,
compare a heater temperature of a heating zone of the heated garment to a sum of a predetermined value and the temperature setpoint,
compare the heater temperature to a difference between the temperature setpoint and the predetermined value, and
turn on, in response to the heater temperature equaling the difference, the heating zone.

2. The power source of claim 1, wherein the controller is configured to wirelessly communicate one or more from a group consisting of: transmit a status of the battery cells to the device, receive heated garment preset temperature information from the device, and receive desired temperature information from the device.

3. The power source of claim 1, wherein the controller is configured to communicate one or more selected from a group consisting of: enable heated garment components of the heated garment, receive temperature information from the heated garment, receive garment type information from the heated garment, and control heated zones within the heated garment.

4. The power source of claim 1, wherein the electrical interface includes a dual connection port for transmitting power and data to the heated garment via the wired connection.

5. The power source of claim 1, wherein the power source wirelessly communicates with the device using Bluetooth.

6. The power source of claim 1, wherein the controller is configured to:
determine that the heated garment is coupled to the power source,
determine an amount of power within the battery cells,
determine an amount of power being used by the heated garment,
determine a first value by multiplying the amount of power being used by the heated garment by a set runtime,
compare the amount of power within the battery cells to the first value, and
decrease, in response to the amount of power within the battery cells being less than the first value, a heating level in a heating zone of the heated garment.

7. The power source of claim 6, wherein the set runtime is set via a user interface of the device and wirelessly communicated to the controller.

8. The power source of claim 6, wherein the controller is further configured to:
determine that a second heated garment is coupled to the power source,
wait a predetermined amount of time,
determine a second amount of power within the battery cells,
determine a second amount of power being used by the heated garment and the second heated garment,
determine a second value by multiplying the second amount of power being used by the heated by the set runtime,
compare the second amount of power within the battery cells to the second value, and
decrease, in response to the second amount of power within the battery cells being less than the second value, the heating level in the heating zone of the heated garment, a second heating level in a second heating zone of the second heated garment, or both.

9. The power source of claim 1, wherein the controller is further configured to:
turn off, in response to the heater temperature equaling the sum, the heating zone.

10. A method of providing power to a heated garment from a battery pack, the method comprising:
pairing, via a pack transceiver of the battery pack, the battery pack to an external device;
receiving, via the pack transceiver, a first input from the external device;
determining, via a pack electronic processor of the battery pack coupled to the pack transceiver, an amount of current to provide to a first heating zone of the heated garment based on the first input;
providing, via a wired connection between the battery pack and the heated garment, the amount of current to the first heating zone of the heated garment;
receiving, via the pack electronic processor, a signal from an output port of the battery pack;
determining, based on the signal, a second external device has been electrically coupled to the battery pack; and
providing, via the output port of the battery pack, a charging power to the second external device.

11. The method of claim 10 further comprising:
receiving, via the pack transceiver, a second input from the external device;
determining, via the pack electronic processor, a second amount of current to provide to a second heating zone of the heated garment based on the second input; and
providing, via the wired connection, the amount of current to the first heating zone and the second amount of current to the second heating zone of the heated garment.

12. The method of claim 10, wherein the first input includes a heater temperature setpoint input, a heater runtime input, or both.

13. A power source for a heated garment, comprising:
a housing;
one or more battery cells located within the housing;
a user interface positioned on the housing;
an electrical interface positioned on the housing for connecting to the heated garment; and
a controller located within the housing and including an electronic processor and a memory, the controller coupled to the battery cells, the user interface, and the electrical interface, the controller being configured to:
communicate with the heated garment and a device,
communicate with and provide power to the heated garment via a wired connection,
wirelessly communicate with the device,
determine that the heated garment is coupled to the power source,
determine an amount of power within the battery cells,
determine an amount of power being used by the heated garment,
determine a first value by multiplying the amount of power being used by the heated garment by a set runtime,
compare the amount of power within the battery cells to the first value,
decrease, in response to the amount of power within the battery cells being less than the first value, a heating level in a heating zone of the heated garment
determine that a second heated garment is coupled to the power source,
wait a predetermined amount of time,
determine a second amount of power within the battery cells,
determine a second amount of power being used by the heated garment and the second heated garment,
determine a second value by multiplying the second amount of power being used by the heated by the set runtime,
compare the second amount of power within the battery cells to the second value, and
decrease, in response to the second amount of power within the battery cells being less than the second value, the heating level in the heating zone of the heated garment, a second heating level in a second heating zone of the second heated garment, or both.

14. The power source of claim 13, wherein the set runtime is set via a user interface of the device and wirelessly communicated to the controller.

* * * * *